(12) United States Patent
Harada

(10) Patent No.: US 11,799,408 B2
(45) Date of Patent: Oct. 24, 2023

(54) CONTROLLER FOR AC ROTARY ELECTRIC MACHINE

(71) Applicant: Mitsubishi Electric Corporation, Tokyo (JP)

(72) Inventor: Shingo Harada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/388,159

(22) Filed: Jul. 29, 2021

(65) Prior Publication Data

US 2022/0131488 A1 Apr. 28, 2022

(30) Foreign Application Priority Data

Oct. 27, 2020 (JP) .................................. 2020-179445

(51) Int. Cl.
*H02P 21/22* (2016.01)
*H02P 21/14* (2016.01)
(Continued)

(52) U.S. Cl.
CPC ............ *H02P 21/22* (2016.02); *H02P 21/141* (2013.01); *H02P 21/18* (2016.02); *H02P 21/20* (2016.02);
(Continued)

(58) Field of Classification Search
CPC ........ H02P 21/22; H02P 21/141; H02P 21/18; H02P 21/20; H02P 25/22; H02P 27/08; H02P 2207/05; H02P 3/22; H02P 21/24
See application file for complete search history.

(56) References Cited

U.S. PATENT DOCUMENTS

2003/0102839 A1   6/2003  Kinpara et al.
2005/0024009 A1*  2/2005  Kinpara .................. H02P 21/22
                                                                    318/700
(Continued)

FOREIGN PATENT DOCUMENTS

JP      11-075394 A    3/1999
JP    2010-279095 A   12/2010
(Continued)

OTHER PUBLICATIONS

Notice of Reasons for Refusal dated Nov. 24, 2021 from the Japanese Patent Office in Japanese Application No. 2020-179445.
(Continued)

*Primary Examiner* — Muhammad S Islam
*Assistant Examiner* — Bradley R Brown
(74) *Attorney, Agent, or Firm* — Sughrue Mion, PLLC; Richard C. Turner

(57) ABSTRACT

To provide a controller for AC rotary electric machine which can suppress that the control accuracy of current is deteriorated, when switching from the all phase short circuit state to the switching control. A controller for AC rotary electric machine calculates voltage command values based on current command values and current detection values; carries out switching between a switching control that turns on and off plural switching devices provided in the inverter based on the voltage command values, and all phase short circuit control that turns on and off the plural switching devices so that the plural-phase windings are short-circuited mutually; and when switching from the all the phase short circuit control to the switching control, sets the current command values to switching current values which are current values corresponding to currents which flow in executing the all phase short circuit control.

14 Claims, 11 Drawing Sheets

(51) Int. Cl.
*H02P 27/08* (2006.01)
*H02P 25/22* (2006.01)
*H02P 21/18* (2016.01)
*H02P 21/20* (2016.01)

(52) U.S. Cl.
CPC .............. *H02P 25/22* (2013.01); *H02P 27/08* (2013.01); *H02P 2207/05* (2013.01)

(56) References Cited

U.S. PATENT DOCUMENTS

2011/0029179 A1    2/2011  Miyazaki et al.
2018/0006593 A1*   1/2018  Watanabe ................ H02P 5/74

FOREIGN PATENT DOCUMENTS

JP      2011-36008 A     2/2011
JP         4672236 B2    4/2011
JP         6253850 B2   12/2017
JP      2018-007390 A    1/2018

OTHER PUBLICATIONS

Office Action dated Jan. 10, 2023 in Japanese Application No. 2022-003453.

* cited by examiner

CONTROLLER FOR AC ROTARY ELECTRIC MACHINE

INCORPORATION BY REFERENCE

The disclosure of Japanese Patent Application No. 2020-179445 filed on Oct. 27, 2020 including its specification, claims and drawings, is incorporated herein by reference in its entirety.

BACKGROUND

The present disclosure relates to a controller for AC rotary electric machine.

As the controller of AC rotary electric machine (hereinafter, referred to also as a motor), the sensorless system which drives the motor without using the position sensor of the rotor spreads widely. In the controller for AC rotary electric machine of this sensorless system, the configuration which restarts the inverter from the state where the inverter stops and the rotor races is disclosed.

In the technology of JP H11-75394 A, the windings are short-circuited for a certain time when the motor is racing. The estimation value of position is initialized, using position and speed of the rotor which are estimated based on the winding current at that time, and the time until restarting. Then, the inverter is restarted.

In the technology of JP 2018-7390 A, the windings are short-circuited when the motor is racing. The estimation value of position is initialized, using the position of the rotor estimated based on the winding current at that time. Then, the inverter is restarted.

In the technology of JP 2010-279095 A, the sensorless controller of the AC motor which can perform fast and high precision speed control by performing current feedback control and feedforward control is disclosed.

SUMMARY

However, in the technology of JP H11-75394 A, since the inverter is stopped again after the windings were short-circuited, in the system that the induced voltage of the motor exceeds the power source voltage, an unintended regenerative current will flow. Accordingly, for example, if it applies to the system that the motor is connected to the engine in the vehicle, and the battery is used for the power source, the overcharge of the battery may be caused.

In the technology of JP 2018-7390 A, since the inverter is restarted from the short circuit state, the estimation itself can be performed. However, since the influence of current which flowed in the short circuit state is not considered when restarting, the control accuracy of current may be deteriorated just after restarting, and the estimation accuracy may be deteriorated.

Similarly, also in JP 2010-279095 A, it is not considered that the inverter is restarted from the three-phase short circuit state.

Therefore, even if the technologies of these patent documents are combined and carried out, since the influence of current which flowed in the three-phase short circuit state is not considered, the control accuracy of current may be deteriorated and the torque fluctuation may be caused, just after restarting from the three-phase short circuit state. Moreover, if the sensorless control is performed, due to deterioration of the control accuracy of current, the estimation accuracy of the rotational angle and the rotational angle speed may be deteriorated, and torque fluctuation may occur.

Then, the purpose of the present disclosure is to provide a controller for AC rotary electric machine which can suppress that the control accuracy of current is deteriorated, when switching from all phase short circuit state where the plural-phase windings are short-circuited mutually to the switching control which turns on and off switching devices based on voltage command values.

A controller for AC rotary electric machine, according to the present disclosure, that controls an AC rotary electric machine which is provided with a stator having plural-phase windings and a rotor via an inverter, the controller for AC rotary electric machine including:

a current detection unit that detects currents which flows into the plural-phase windings;

a current command value calculation unit that sets current command values;

a voltage command value calculation unit that calculates voltage command values, based on the current command values and current detection values; and an inverter control unit that carries out switching between a switching control that turns on and off plural switching devices provided in the inverter based on the voltage command values, and applies voltages to the plural-phase windings, and all phase short circuit control that turns on and off the plural switching devices so that the plural-phase windings are short-circuited mutually, wherein when switching from the all phase short circuit control to the switching control, the current command value calculation unit sets the current command values to switching current values which are current values corresponding to currents which flow in executing the all phase short circuit control.

According to the controller for AC rotary electric machine of the present disclosure, when switching from the all phase short circuit control to the switching control, the current command values are set to the switching current values which are current values corresponding to the currents which flow when executing the all phase short circuit control. Accordingly, the deviation between the current values when executing the all phase short circuit control which was executed just before, and the current command values of the switching control can be made small. Accordingly, at switching, the current deviations between the current command values and the current detection values can be made small, it can be suppressed that the operating amount becomes excessive transitionally and the current values is fluctuated largely, and it can be suppressed that torque fluctuation occurs transitionally.

DETAILED DESCRIPTION OF THE EMBODIMENTS

1. Embodiment 1

Figure 1:
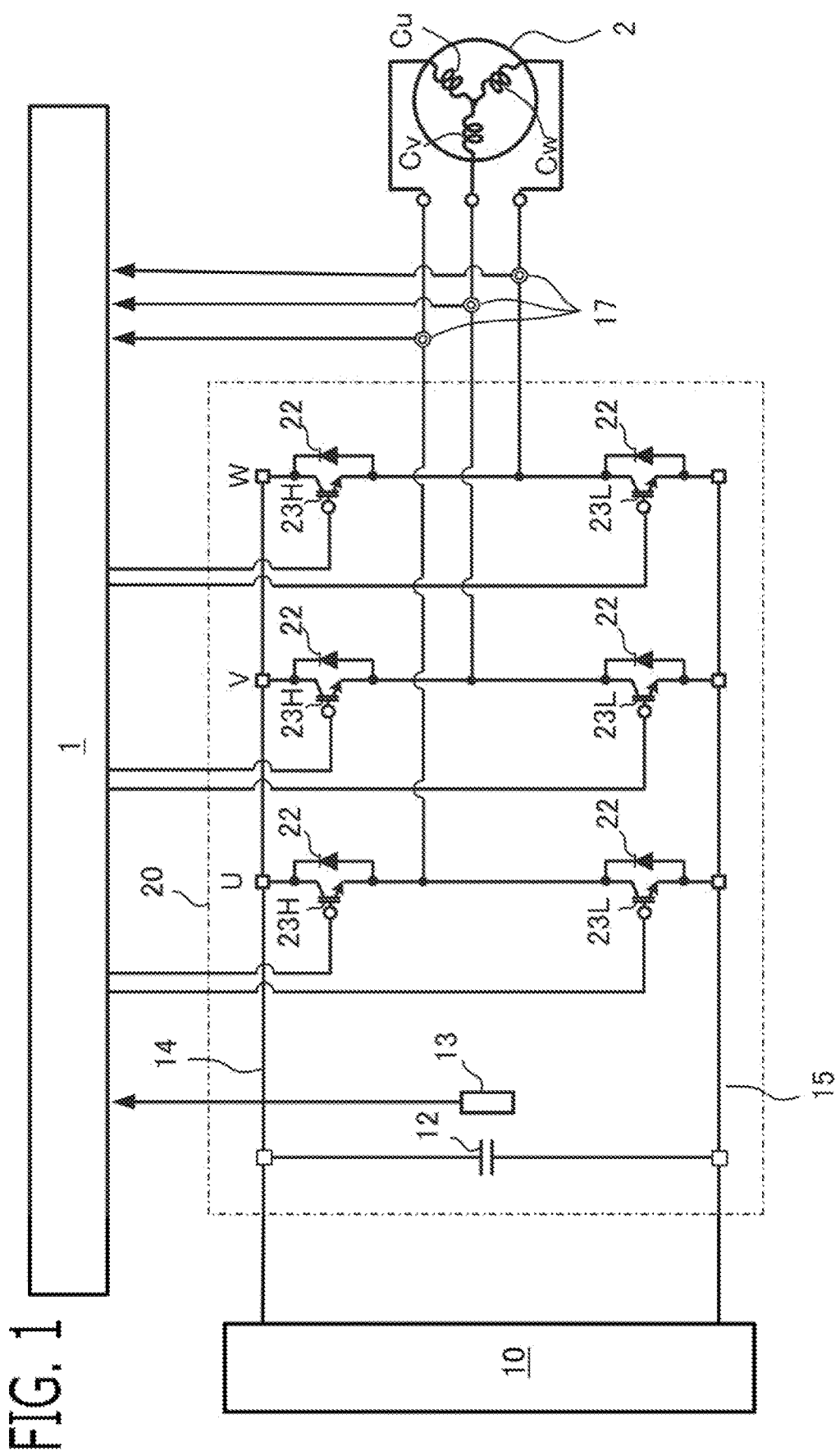
FIG. 1 is a schematic configuration diagram of the AC rotary electric machine and the controller for AC rotary electric machine according to Embodiment 1.

A controller for AC rotary electric machine (hereinafter, referred to simply as the controller 1) according to Embodiment 1 will be explained with reference to drawings. FIG. 1 is a schematic configuration diagram of the AC rotary electric machine 2 and the controller 1 according to the present embodiment.

1-1. AC Rotary Electric Machine

The AC rotary electric machine 2 is provided with a stator having plural-phase windings, and a rotor. In the present embodiment, three-phase windings Cu, Cv, Cw of U phase, V phase, and W phase are provided. The three-phase windings Cu, Cv, Cw are connected by star connection. The three-phase windings may be connected by delta connection. The AC rotary electric machine 2 is a permanent magnet type synchronous rotary electric machine, and the magnets are provided in the rotor.

1-2. Inverter

The inverter 20 is an electric power converter which performs power conversion between the DC power source 10 and the three-phase windings, and has a plurality of switching devices. The inverter 20 is provided with three sets of a series circuit (leg) where a positive electrode side switching device 23H (upper arm) connected to the positive electrode side of the DC power source 10 and a negative electrode side switching device 23L (lower arm) connected to the negative electrode side of the DC power source 10 are connected in series, corresponding to respective phase of the three-phase windings. The inverter 20 is provided with a total of six switching devices of the three positive electrode side switching devices 23H, and the three negative electrode side switching devices 23L. Then, a connection node where the positive electrode side switching device 23H and the negative electrode side switching device 23L are connected in series is connected to the winding of the corresponding phase.

Specifically, in each phase of the series circuit, the collector terminal of the positive electrode side switching device 23H is connected to the positive electrode side wire 14, the emitter terminal of the positive electrode side switching device 23H is connected to the collector terminal of the negative electrode side switching device 23L, and the emitter terminal of the negative electrode side switching device 23L is connected to the negative electrode side electric wire 15. The connection node between the positive pole side switching device 23H and the negative pole side switching device 23L is connected to the winding of the corresponding phase. IGBT (Insulated Gate Bipolar Transistor) in which a diode 22 is connected in inverse parallel, MOSFET (Metal Oxide Semiconductor Field Effect Transistor) which has a function of diode connected in inverse parallel, or the like is used for the switching device. A gate terminal of the each switching device is connected to the controller 1. The each switching device is turned on or turned off by the control signal outputted from the controller 1.

A smoothing capacitor 12 is connected between the positive electrode side wire 14 and the negative electrode side wire 15. A power source voltage sensor 13 which detects a power source voltage supplied to the inverter 20 from the DC power source 10 is provided. The power source voltage sensor 13 is connected between the positive electrode side electric wire 14 and the negative electrode side electric wire 15. An output signal of the power source voltage sensor 13 is inputted to the controller 1.

The current sensor 17 outputs an electric signal according to current which flows into the winding of each phase. The current sensor 17 is provided on the each phase wire which connects the series circuit of the switching devices and the winding. An output signal of the current sensor 17 is inputted into the controller 1. The current sensor 17 may be provided in the series circuit of each phase.

A chargeable and dischargeable electricity accumulation device (for example, a lithium ion battery, a nickel hydride battery, an electrical double layer capacitor) is used for the DC power source 10. A DC-DC converter which is a DC electric power converter which steps up or steps down the DC voltage may be provided in the DC power source 10.

1-3. Controller

Figure 2:
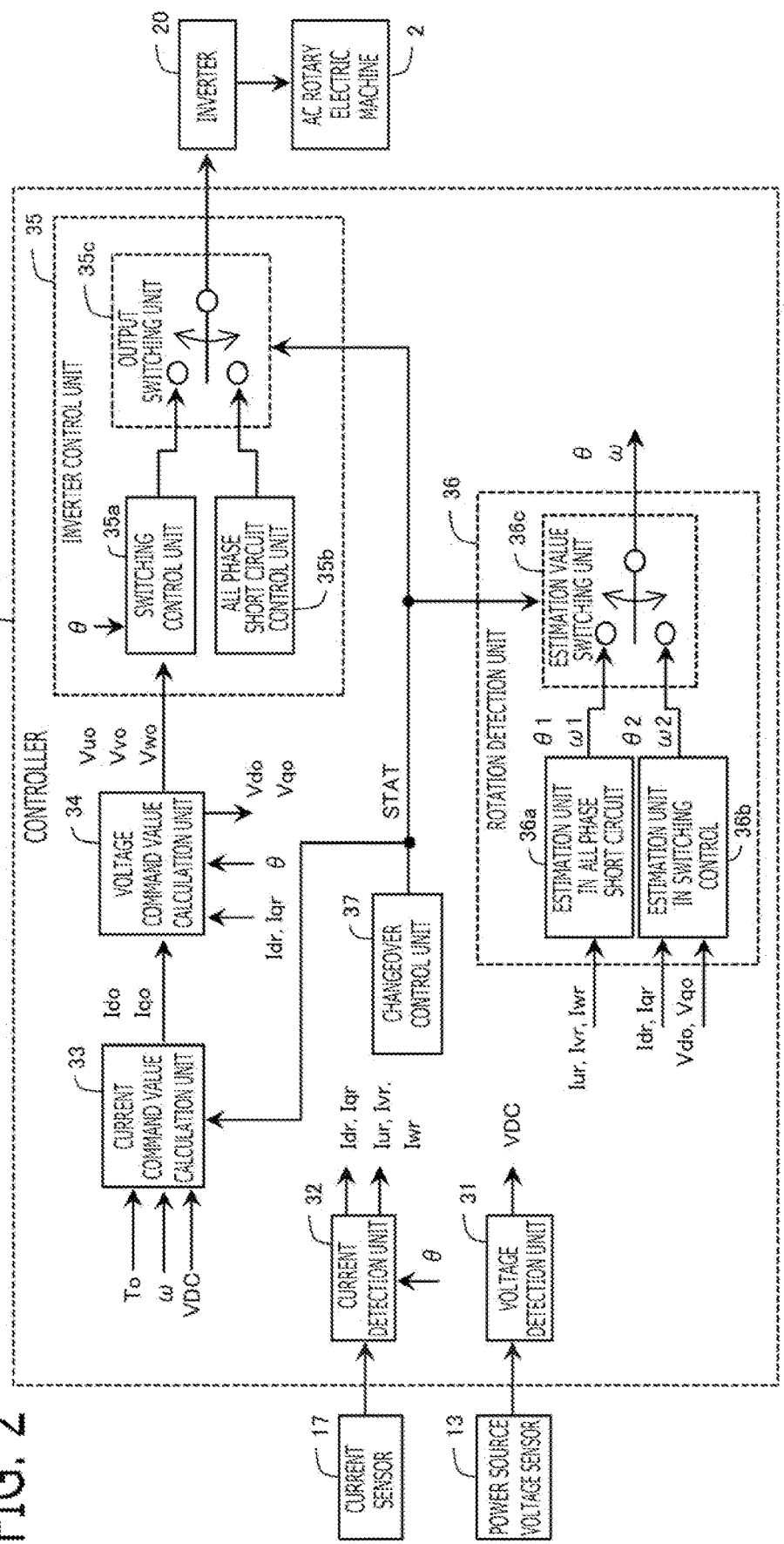
FIG. 2 is a schematic block diagram of the controller for AC rotary electric machine according to Embodiment 1.
Figure 3:
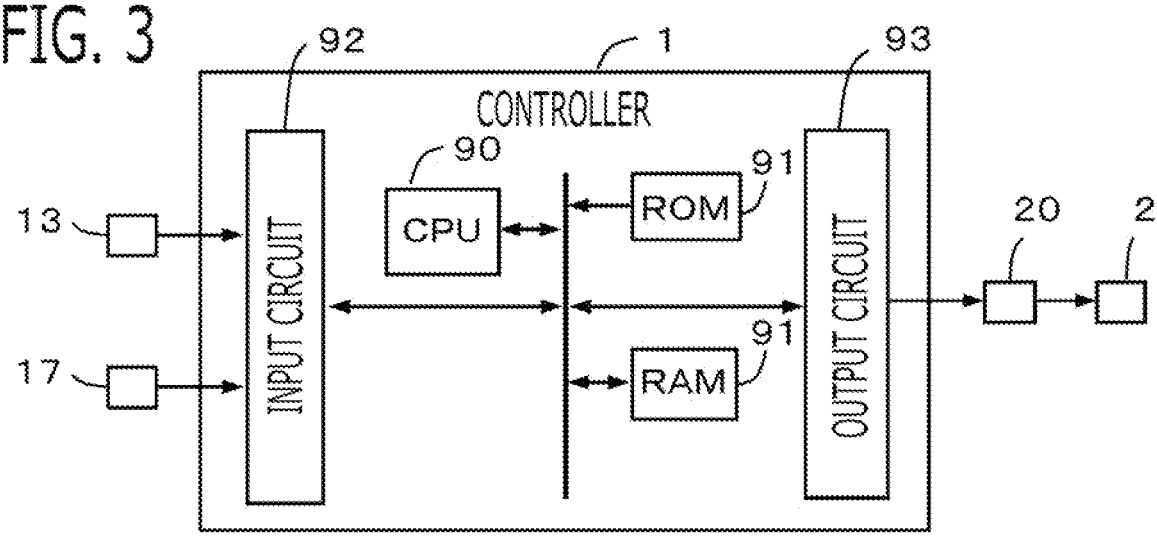
FIG. 3 is a hardware configuration diagram of the controller for AC rotary electric machine according to Embodiment 1.

The controller 1 controls the AC rotary electric machine 2 via the inverter 20. As shown in FIG. 2, the controller 1 is provided with a voltage detection unit 31, a current detection unit 32, a current command value calculation unit 33, a voltage command value calculation unit 34, an inverter control unit 35, a rotation detection unit 36, a changeover control unit 37, and the like. Each function of the controller 1 is realized by processing circuits provided in the controller 1. Specifically, as shown in FIG. 3, the controller 1 is provided with, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. The input circuit 92 is connected with various kinds of sensors and switches such as the power source voltage sensor 13 and the current sensor 17, and is provided with A/D converter and the like for inputting output signals from the sensors and the switches to the arithmetic processor 90. The output circuit 93 is connected with electric loads such as a gate drive circuit which drive on/off of the switching devices, and is provided with a driving circuit and the like for outputting a control signal from the computing processing unit 90.

Then, the arithmetic processor 90 runs software items (programs) stored in the storage apparatus 91 such as ROM and collaborates with other hardware devices in the controller 1, such as the storage apparatus 91, the input circuit 92, and the output circuit 93, so that the respective functions of the control units 31 to 37 of FIG. 2 provided in the controller 1 are realized. Various kinds of setting data items to be utilized in the control units 31 to 37 are stored, as part of software items (programs), in the storage apparatus 91 such as ROM. Each function of the controller 1 will be described in detail below.

1-3-1. Voltage Detection Unit 31

The voltage detection unit 31 detects a power source voltage VDC supplied to the inverter 20 from the DC power source 10. In the present embodiment, the voltage detection unit 31 detects the power source voltage VDC, based on the output signal of the power source voltage sensor 13.

1-3-2. Current Detection Unit 32

The current detection unit 32 detects currents Iur, Ivr, Iwr which flow into three-phase windings. In the present embodiment, the current detection unit 32 detects currents Iur, Ivr, Iwr which flow into the respective phase windings Cu, Cv, Cw from the inverter 20, based on the output signal of the current sensor 17. Herein, Iur is a current detection value of U phase, Ivr is a current detection value of V phase, and Iwr is a current detection value of W phase. The current sensor 17 may detect the winding currents of two phases, and the winding current of the remaining one phase may be calculated based on the detection values of winding currents of two phases. For example, the current sensor 17 detects the winding currents Ivr, Iwr of V phase and W phase, and the winding current Iur of U phase may be calculated by Iur=−Ivr−Iwr.

The current detection unit 32 converts the current detection values of three-phase Iur, Ivr, Iwr into the current detection value of d-axis Idr and the current detection value of q-axis Iqr on a rotating coordinate system of d-axis and q-axis. The rotating coordinate system of d-axis and q-axis is a rotating coordinate system of two-axis which consist of a d-axis defined in the direction of the detected magnetic pole position θ and a q-axis defined in a direction which advanced to the d-axis by 90 degrees in the electrical angle. And, it rotates synchronizing with rotation of the magnetic pole position of the rotor. Specifically, the current detection unit 32 converts the current detection values of three-phase Iur, Ivr, Iwr into the current detection value d-axis Idr and the current detection value of q-axis Iqr, by performing a three-phase/two-phase conversion and a rotating coordinate conversion based on the magnetic pole position θ.

1-3-3. Voltage Command Value Calculation Unit 34

The voltage command value calculation unit 34 calculates voltage command values, based on the current command values and the current detection values. In the present embodiment, the voltage command value calculation unit 34 calculates voltage command values of three-phase Vuo, Vvo, Vwo as the voltage command values.

The voltage command value calculation unit 34 performs a current feedback control that changes a voltage command value of d-axis Vdo and a voltage command value of q-axis Vqo by PI control or the like, so that the current detection value of d-axis Idr approaches the current command value of d-axis Ido, and the current detection value of q-axis Iqr approaches the current command value of q-axis Iqo. Feed-forward control for non-interfering between the d-axis current and the q-axis current and the like may be performed.

For example, the voltage command value calculation unit 34 performs calculation shown in the next equation, and calculates the voltage command values of d-axis and q-axis Vdo, Vqo. In the equation (1), feedback control and feed-forward control are performed.

$$\begin{pmatrix} V_{do} \\ V_{qo} \end{pmatrix} = \omega_{cc} \begin{pmatrix} \frac{R}{s} + L_d & 0 \\ 0 & \frac{R}{s} + L_q \end{pmatrix} \begin{pmatrix} I_{do} - I_{dr} \\ I_{qo} - I_{qr} \end{pmatrix} + \\ \begin{pmatrix} R & -\omega L_q \\ \omega L_d & R \end{pmatrix} \frac{\omega_{cc}}{s + \omega_{cc}} \begin{pmatrix} I_{do} \\ I_{qo} \end{pmatrix} + \begin{pmatrix} 0 \\ \frac{\omega \psi_p}{s} \end{pmatrix} \quad (1)$$

Herein, R is a winding resistor, Ld is an inductance of d-axis, Lq is an inductance of q-axis, ω is a rotational angle speed, Ψp is an interlinkage flux by the permanent magnet, ωcc is a target response angular frequency of current control, and s is a Laplace operator.

The voltage command value calculation unit 34 converts the current command values of d-axis and q-axis Vdo, Vqo into the voltage command values of three-phase Vuo, Vvo, Vwo, by performing a fixed coordinate conversion and a two-phase/three-phase conversion based on the magnetic pole position θ. A zero phase component, such as a third order harmonic wave, may be added to the voltage command values of three-phase.

1-3-4. Inverter Control Unit 35

The inverter control unit 35 carries out switching between a switching control that turns on and off the plural switching devices provided in the inverter based on the voltage command values by PWM (Pulse Width Modulation) control, and applies voltages to three-phase windings, and all phase short circuit control that turns on and off the plural switching devices so that the three-phase windings are short-circuited mutually.

In the present embodiment, the inverter control unit 35 is provided with a switching control unit 35a, an all phase short circuit control unit 35b, and an output switching unit 35c.

The switching control unit 35a turns on and off the plural switching devices by PWM control based on the voltage command values of three-phase Vuo, Vvo, Vwo. The switching control unit 35a generates a switching signal which turns on and off the switching device of each phase, by comparing each of the voltage command values of three-phase and a carrier wave. The carrier wave is a triangular wave which vibrates with an amplitude of ½ of the power source voltage VDC centering on 0 at a carrier frequency. The switching control unit 35a turns on the switching signal when the voltage command value exceeds the carrier wave, and turns off the switching signal when the voltage command value is below the carrier wave. The switching signal is transmitted as it is to the positive electrode side switching device, and a switching signal obtained by reversing the switching signal is transmitted to the negative electrode side switching device.

The all phase short circuit control unit 35b generates switching signals which turns on the positive electrode side switching devices of all three-phase and turns off the negative electrode side switching devices of all three-phase; or generates the switching signal which turns off the positive electrode side switching devices of all three-phase and turns on the negative electrode side switching devices of all three-phase. Accordingly, terminals of the three-phase windings are short-circuited mutually.

When determining that the switching control is executed by the changeover control unit 37 described below (switching signal STAT=1), the output switching unit 35c makes each switching signal of the switching control unit 35a input into the gate terminal of each switching device of the inverter 20 via the gate drive circuit, and turns on or turns off each switching device. When determining that the all phase short circuit control is executed by the changeover control unit 37 (switching signal STAT=0), the output switching unit 35c makes each switching signal of the all phase short circuit control unit 35b input into the gate terminal of each switching device of the inverter 20 via the gate drive circuit, and turns on or turns off each switching device.

1) When STAT=1: outputting the signals of the switching control unit 35a to the inverter
2) When STAT=0: outputting the signals of the all phase short circuit control unit 35b to the inverter 1-3-5. Current Command Value Calculation Unit 33

The current command value calculation unit 33 calculates the current command values. In the present embodiment, the current command value calculation unit 33 calculates the current command value of d-axis Ido and the current command value of q-axis Iqo as the current command values.

Figure 4:
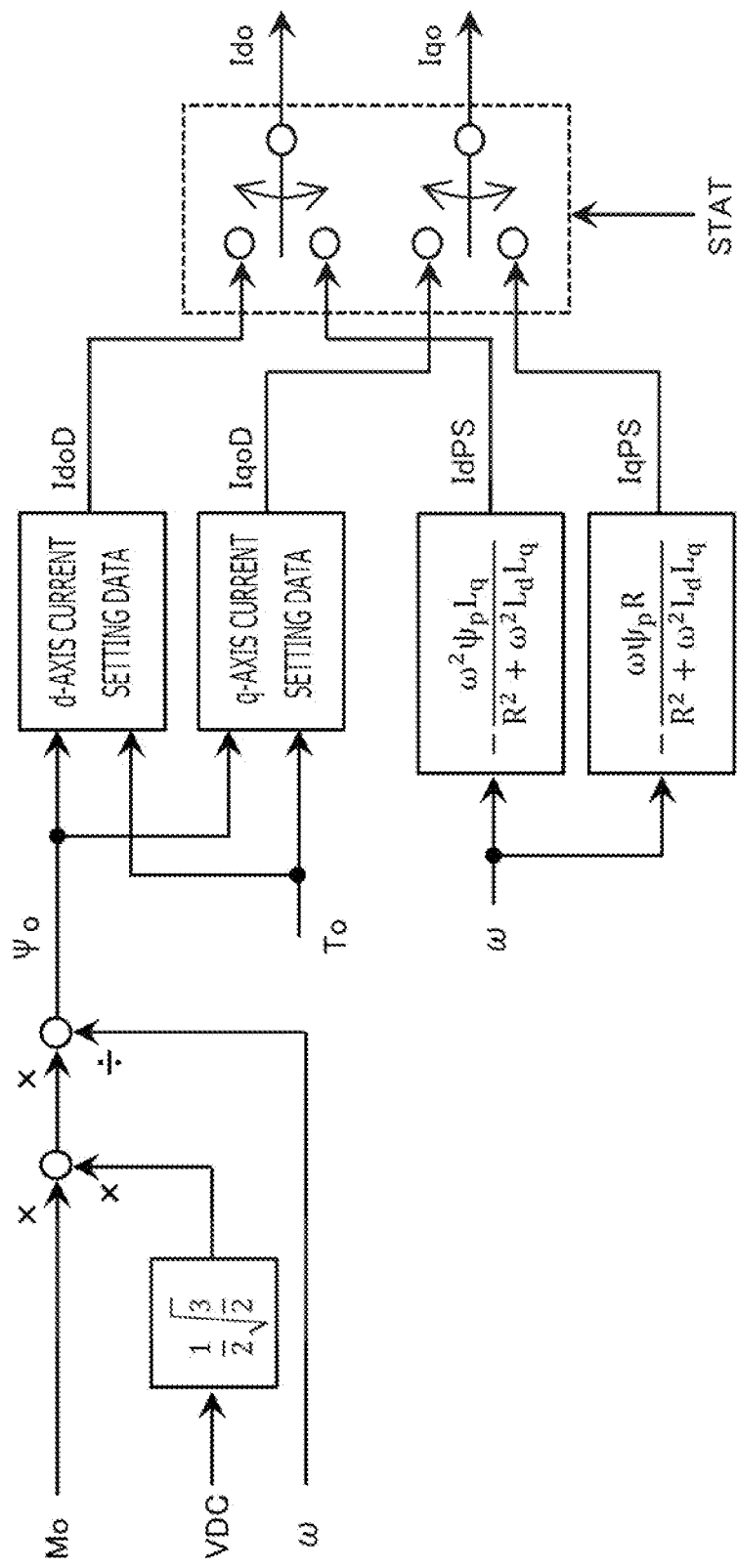
FIG. 4 is a block diagram of the current command value calculation unit according to Embodiment 1.

As shown in FIG. 4, the current command value calculation unit 33 calculates a target value of modulation rate Mo. In the present embodiment, the target value of modulation rate Mo is set to a constant value (for example, 1.2). The target value of modulation rate Mo may be changed based on operating condition, such as the torque command value To and the rotational angle speed ω. The modulation rate is a ratio of an amplitude of a fundamental wave component of the applied voltages of three-phase windings with respect to the power source voltage VDC/2.

The current command value calculation unit 33 calculates an interlinkage flux command value Ψo, based on the target value of modulation rate Mo. The interlinkage flux command value Ψo is a command value of armature interlinkage flux. The current command value calculation unit 33 calculates the interlinkage flux command value Ψo by multiplying the power source voltage VDC to the target value of modulation rate Mo, and dividing by the rotational angle speed ω. In detail, as shown in FIG. 4 and the next equation, the current command value calculation unit 33 calculates the interlinkage flux command value Ψo by multiplying ½×√(3/2) and the power source voltage VDC to the target value of modulation rate Mo, and dividing by the rotational angle speed ω.

$$\Psi_o = M_o \frac{1}{2}\sqrt{\frac{3}{2}} \frac{VDC}{\omega} \quad (2)$$

The interlinkage flux command value Ψo may be corrected by feedback control so that a difference between the target value of modulation rate Mo and an actual modulation rate Mr becomes small. The actual modulation rate Mr is calculated based on the voltage command values of dq-axis Vdo, Vqo, for example.

The current command value calculation unit 33 calculates a normal current command value of d-axis IdoD and a normal current command value of q-axis IqoD, based on the interlinkage flux command value Ψo and the torque command value To. By referring to a d-axis current setting data in which a relationship among the interlinkage flux command value Ψo, the torque command value To, and the current command value of d-axis IdoD is preliminarily set, the current command value calculation unit 33 calculates the normal current command value of d-axis IdoD corresponding to the calculated interlinkage flux command value Ψo and the torque command value To. By referring to a q-axis current setting data in which a relationship among the interlinkage flux command value Ψo, the torque command value To, and the current command value of q-axis IqoD is preliminarily set, the current command value calculation unit 33 calculates the normal current command value of q-axis IqoD corresponding to the calculated interlinkage flux command value Ψo and the torque command value To.

The torque command value To may be calculated in the controller 1, or may be transmitted from an external apparatus.

<Setting of Current Command Values at Switching>

When switching from the all phase short circuit control to the switching control, the deviations between the current values in executing the all phase short circuit control and the current command values of the switching control becomes large. Accordingly, transitionally, operating amount may become excessive and torque fluctuation may occur. Therefore, when switching from the all phase short circuit control to the switching control, it is desired to suppress that the current deviations becomes large and to suppress that torque fluctuation occurs transitionally.

Then, when switching from the all phase short circuit control to the switching control, the current command value calculation unit 33 sets the current command values to switching current values which are current values corresponding to currents which flow in executing the all phase short circuit control. In the present embodiment, when switching from the all phase short circuit control to the switching control, the current command value calculation unit 33 sets the current command values of d-axis and q-axis Ido, Iqo to a switching current value of d-axis IdPS and a switching current value of q-axis IqPS which are current values corresponding to currents which flow in executing the all phase short circuit control.

According to this configuration, at switching from the all phase short circuit control to the switching control, the deviations between the current values in executing the all phase short circuit control and the current command values of the switching control can be made small. Accordingly, at switching, the current deviations between the current command values and the current detection values can be made small, it can be suppressed that the operating amount becomes excessive transitionally and the current values is fluctuated largely, and it can be suppressed that torque fluctuation occurs transitionally.

<Setting of Switching Current Values>

The current values of d-axis and q-axis in executing the all phase short circuit control will be derived. The voltage equation on the rotating coordinate system of d-axis and q-axis becomes the equation (3).

$$\begin{cases} V_d = RI_d + L_d \frac{dI_d}{dt} - \omega L_q I_q \\ V_q = RI_q + L_q \frac{dI_q}{dt} - \omega(L_d I_d + \psi_p) \end{cases} \quad (3)$$

Since in the all phase short circuit control, the three-phase windings are short-circuited and the voltages are not applied to the three-phase windings, it is set that the d-axis voltage Vd=0 and the q-axis voltage Vq=0 in the equation (3). Assuming that it is in the steady state, it is set that a differential value of d-axis current dId/dt=0, and a differential value of q-axis current dIq/dt=0. Then, if the simultaneous equations are solved for the d-axis current Id and the q-axis current Iq, the equation (4) is obtained. The d-axis current Id and the q-axis current Iq in the equation (4) can be set as the switching current value of d-axis IdPS and the switching current value of q-axis IqPS which are current values corresponding to currents flowing in executing the all phase short circuit control.

$$\begin{cases} I_d = -\dfrac{\omega^2 \psi_p L_q}{R^2 + \omega^2 L_d L_q} = I_{dPS} \\ I_q = -\dfrac{\omega \psi_p R}{R^2 + \omega^2 L_d L_q} = I_{qPS} \end{cases} \quad (4)$$

Then, in the present embodiment, using the equation (4), the current command value calculation unit 33 sets the switching current value of d-axis IdPS and the switching current value of q-axis IqPS, based on the rotational angle speed ω. Preliminarily set values are used for the d-axis inductance Ld, the q-axis inductance Lq, the Interlinkage flux of the magnet Ψp, and the resistance value of winding R in the equation (4). Instead of the equation (4), a setting data of d-axis switching value in which a relationship between the rotational angle speed ω and the switching current value of d-axis IdPS is preliminarily set, and a setting data of q-axis switching value in which a relationship between the rotational angle speed W and the switching current value of q-axis IqPS is preliminarily set may be used.

When switching from the all phase short circuit control to the switching control, the current command value calculation unit 33 sets the current command values of d-axis and q-axis Ido, Iqo to the switching current values of d-axis and q-axis IdPS, IqPS, and after that, changes gradually the current command values of d-axis and q-axis Ido, Iqo from the switching current values of d-axis and q-axis IdPS, IdPS to the normal current command values of d-axis and q-axis IdoD, IqoD which are normally set in the switching control.

According to this configuration, it can be suppressed that the deviations between the current detection values and the current command values of the switching control become large, and while suppressing that torque fluctuation occurs transitionally, it can be switched smoothly to the switching control using the normal current command values.

When switching from the all phase short circuit control to the switching control, the current command value calculation unit 33 sets the current command values of d-axis and q-axis Ido, Iqo to the switching current values of d-axis and q-axis IdPS, IqPS, and after a waiting time Tdly elapses, changes gradually the current command values of d-axis and q-axis Ido, Iqo from the switching current values of d-axis and q-axis IdPS, IqPS to the normal current command values of d-axis and q-axis IdoD, IqoD which are normally set in the switching control.

According to this configuration, since the waiting time Tdly is provided after the current command values are set to the switching current values and the switching control is started, the gradual change of the current command values can be started after each control value is stabilized, and it can be switched to the switching control using the normal current command values more stably.

The waiting time Tdly is preferably set corresponding to a period until currents are stabilized to the switching current values after switching to the switching control.

1-3-6. Rotation Detection Unit 36

The rotation detection unit 36 detects the rotational angle θ (the magnetic pole position θ of the rotor) and the rotational angle speed ω of the rotor in the electrical angle. In the present embodiment, the rotation detection unit 36 estimates the rotational angle θ and the rotational angle speed ω, based on the current detection values. The rotation detection unit 36 switches the estimation method between the execution time of the all phase short circuit control, and the execution time of the switching control.

As shown in FIG. 2, the rotation detection unit 36 is provided with an estimation unit in all phase short circuit 36a, an estimation unit in switching control 36b, and an estimation value switching unit 36c.

<Estimation in Executing the all Phase Short Circuit Control>

In executing the all phase short circuit control, using the similar estimation method as JP H11-75394 A, the estimation unit in all phase short circuit 36a estimates the first rotational angle θ1 and the first rotational angle speed ω1 using the next equation.

$$\theta_1 = \tan^{-1}\dfrac{I_\beta}{I_\alpha} - \tan^{-1}\dfrac{I_q}{I_d} \quad (5)$$

$$\omega_1 = \dfrac{d\theta_1}{dt}$$

About the right side first term of the first equation of the equation (5), the estimation unit in all phase short circuit 36a converts the current detection values of three-phase Iur, Ivr, Iwr into a current value of α-axis Iα and a current value of β-axis Iβ, by performing the three-phase/two-phase conversion. About the right side second term of the first equation of the equation (5), Iq/Id is calculated by a table data or a function which uses the first rotational angle speed ω1 as an input. PLL (Phase Locked Loop) configured by software may be used; and θ1 is used as an input, and a value inputted into integrator as an output of controller is used as ω1.

Especially, assuming that the resistance value R of winding is sufficiently smaller than the impedance by the inductance of winding, if it is set that R=0 in the equation (4), the current value of d-axis Id and the current value of q-axis Iq in all phase short circuit are expressed by the next equation; and a current vector is positioned on near the negative side of d-axis, and a phase of the current vector becomes −π.

$$\begin{cases} I_d = -\dfrac{\psi_p}{L_d} \\ I_q = 0 \end{cases} \quad (6)$$

Accordingly, by using the next equation obtained by substituting −π for the right side second term of the first equation of the equation (5), the first rotational angle θ1 may be estimated simply. In this case, the table data mentioned above becomes unnecessary.

$$\theta_1 = \tan^{-1}\dfrac{I_\beta}{I_\alpha} + \pi \quad (7)$$

Since in the estimation by the estimation unit in all phase short circuit 36a, the condition that the estimation value is near the true value are unnecessary, even when the rotational angle speed of the motor becomes excessive, and the three-phase short circuit is executed for fail-safe, the angle estimation can be performed more stable than the estimation unit in switching control 36b described below.

<Estimation in Switching Control>

In executing the switching control, the estimation unit in switching control 36b estimates the second rotational angle $\theta2$ and the second rotational angle speed $\omega2$ using a well-known estimation method (for example, JP 4672236 B). For example, in the angle estimation using the adaptive observer, the current detection values of d-axis and q-axis Idr, Iqr and the voltage command values of d-axis and q-axis Vdo, Vqo are inputted into the adaptive observer, and the second rotational angle $\theta2$ and the second rotational angle speed $\omega2$ are outputted from the adaptive observer. Since the estimation method is well-known technology, detailed explanation is omitted.

When switching from the all phase short circuit control to the switching control, the estimation unit in switching control 36b sets the first rotational angle $\theta1$ and the first rotational angle speed $\omega1$ estimated just before the switching, as the initial values of the second rotational angle $\theta2$ and the second rotational angle speed $\theta2$.

<Estimation Value Switching Unit 36c>

When determining that the switching control is executed by the changeover control unit 37 (the switching signal STAT=1), the estimation value switching unit 36c outputs the second rotational angle $\theta2$ and the second rotational angle speed $\omega2$ estimated by the estimation unit in switching control 36b, as the final rotational angle $\theta$ and the final rotational angle speed $\omega$. On the other hand, when determining that the all phase short circuit control is executed by the changeover control unit 37 (the switching signal STAT=0), the estimation value switching unit 36c outputs the first rotational angle $\theta1$ and the first rotational angle speed $\omega1$ estimated by the estimation unit in all phase short circuit 36a, as the final rotational angle $\theta$ and the final rotational angle speed $\omega$.

1) When STAT=1: $\theta=\theta2$, $\omega=\omega2$
2) When STAT=0: $\theta=\theta1$, $\omega=\omega1$ 1-3-7. Changeover Control Unit 37

The changeover control unit 37 switches between the execution of the switching control, and the execution of the all phase short circuit control. The changeover control unit 37 sets the switching signal STAT=1 when executing the switching control, and sets the switching signal STAT=0 when executing the all phase short circuit control. The changeover control unit 37 switches according to an execution command of the switching control or an execution command of the all phase short circuit control transmitted from an upper control unit or an external controller which are not shown. For example, when operation of the AC rotary electric machine 2 is stopped, the execution of the all phase short circuit control is commanded.

1) When executing switching control: STAT=1
2) When executing all phase short circuit control: STAT=0

1-3-8. Flowchart at Switching

Figure 5:
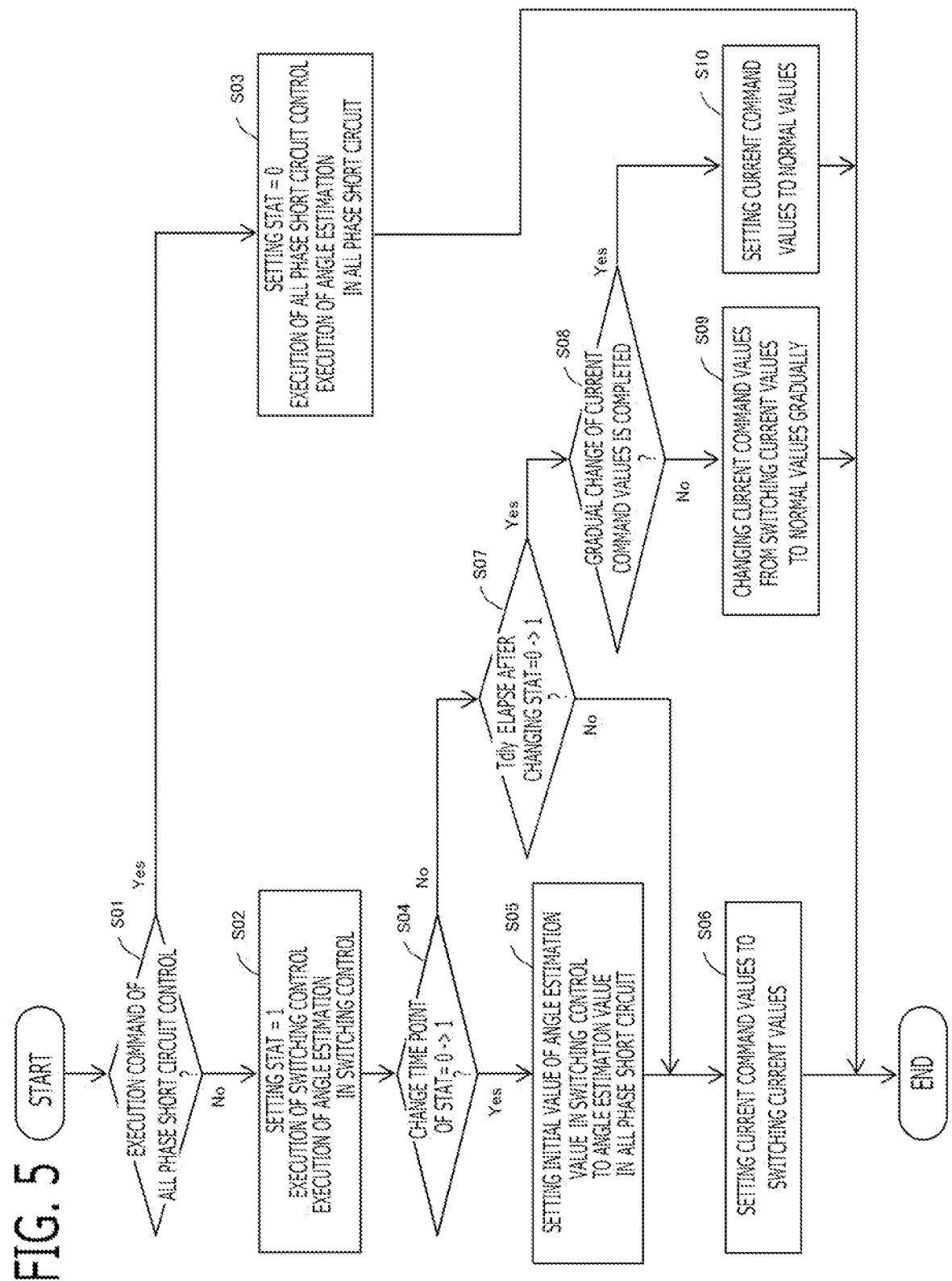
FIG. 5 is a flowchart for explaining the processing at switching according to Embodiment 1.

Processing of the controller related to switching between the all phase short circuit control and the switching control explained above will be explained using the flowchart of FIG. 5. Processing of FIG. 5 is executed at every predetermined calculation period, for example.

In the step S01, the changeover control unit 37 determines whether the execution command of the all phase short circuit control or the execution command of the switching control is transmitted. When the execution command of the switching control is transmitted, it advances to the step S02, and when the execution command of all phase short circuit control is transmitted, it advances to the step S03.

In the step S02, the changeover control unit 37 sets the switching signal STAT=1; and makes the current command value calculation unit 33, the voltage command value calculation unit 34, and the inverter control unit 35 execute the switching control, and makes the rotation detection unit 36 execute the estimation of the rotational angle and the rotational angle speed in switching control.

On the other hand, in the step S03, the changeover control unit 37 sets the switching signal STAT=0; and makes the inverter control unit 35 execute the all phase short circuit control, and makes the rotation detection unit 36 execute the estimation of the rotational angle and the rotational angle speed in all phase short circuit.

In the step S04, the current command value calculation unit 33 determines whether it is a time point when the switching signal STAT changes from 0 to 1; and when it is the change time point, it advances to the step S05, and when it is not the change time point, it advances to step S07. In the step S05, the rotation detection unit 36 sets the first rotational angle $\theta1$ and the first rotational angle speed $\omega1$ in all phase short circuit which were estimated just before the switching, as the initial values of the second rotational angle $\theta2$ and the second rotational angle speed $\omega2$ in switching control.

And, in the step S06, the current command value calculation unit 33 sets the current command values of d-axis and q-axis Ido, Iqo to the switching current values of d-axis and q-axis IdPS, IqPS. In the case where the first-order-lag filter processing is performed in the process for calculating the current command values of d-axis and q-axis Ido, Iqo, the current command value calculation unit 33 may set the current command values of d-axis and q-axis Ido, Iqo to the switching current values of d-axis and q-axis IdPS, IqPS during execution of the all phase short circuit control, so that the current command values of d-axis and q-axis Ido, Iqo become the switching current values of d-axis and q-axis IdPS, IqPS when switching from the all phase short circuit control to the switching control (at the time point when the switching signal STAT changes from 0 to 1). Alternatively, the current command value calculation unit 33 may reset the internal arithmetic values, such as the last time calculation values of the first-order-lag filter processing, to the switching current values of d-axis and q-axis IdPS, IqPS, so that the current command values of d-axis and q-axis Ido, Iqo become the switching current values of d-axis and q-axis IdPS, IqPS when switching from the all phase short circuit control to the switching control (at the time point when the switching signal STAT changes from 0 to 1).

In the step S07, the current command value calculation unit 33 determines whether the waiting time Tdly elapses after the switching signal STAT changes from 0 to 1; and when not elapsing, it advances to the step S06, and when elapsing, it advances to the step S08. In the step S06, the current command value calculation unit 33 sets the current command values of d-axis and q-axis Ido, Iqo to the switching current values of d-axis and q-axis IdPS, IqPS.

On the other hand, in the step S08, the current command value calculation unit 33 determines whether the gradual change of the current command values from the switching current values to the normal current command values which is executed after the waiting time Tdly elapses is completed; and when not completing, it advances to the step S09, and when completing, it advances to the step S10.

In the step S09, the current command value calculation unit 33 changes gradually the current command values of d-axis and q-axis Ido, Iqo from the switching current values of d-axis and q-axis IdPS, IqPS to the normal current command values of d-axis and q-axis IdoD, IqoD.

On the other hand, in the step S10, the current command value calculation unit 33 sets the current command values of d-axis and q-axis Ido, Iqo to the normal current command values of d-axis and q-axis IdoD, IqoD.

1-3-9. Control Behavior and Effect

Next, the control behavior and effect according to the present embodiment will be explained. The next equation is obtained if the voltage equation is Laplace transformed. Since current is flowing in the all phase short circuit state, the right side third term appears.

$$\begin{pmatrix} V_d \\ V_q \end{pmatrix} = \begin{pmatrix} R+sL_d & -\omega L_q \\ \omega L_d & R+sL_q \end{pmatrix} \begin{pmatrix} I_d \\ I_q \end{pmatrix} \begin{pmatrix} 0 \\ \frac{\omega \psi_p}{s} \end{pmatrix} + \begin{pmatrix} -L_d I_{dPS} \\ -L_q I_{qPS} \end{pmatrix} \quad (8)$$

If time elapses enough after setting the current command values to the switching current values and starting the switching control, the current values are stabilized at the current command values (the switching current values). Accordingly, as shown in the next equation, the transfer function of the target value response in the transfer function of the current controller of the equation (1) can be approximated to 1.

$$\frac{\omega_{cc}}{s+\omega_{cc}} = 1 \quad (9)$$

The next equation is obtained, if the equation (9) is substituted for the equation (1), it is assumed that it is Vdo=Vd and Vqo=Vq in the equation (1), and the right side of the equation (8) and the right side of the equation (1) are connected with an equal sign.

$$\begin{pmatrix} R+sL_d & -\omega L_q \\ \omega L_d & R+sL_q \end{pmatrix}\begin{pmatrix} I_d \\ I_q \end{pmatrix} + \begin{pmatrix} -L_d I_{dPS} \\ -L_q I_{qPS} \end{pmatrix} = \\ \omega_{cc} \begin{pmatrix} \frac{R}{s}+L_d & 0 \\ 0 & \frac{R}{s}+L_q \end{pmatrix}\begin{pmatrix} I_{do}-I_d \\ I_{qo}-I_q \end{pmatrix} + \begin{pmatrix} R & -\omega L_q \\ \omega L_d & R \end{pmatrix}\begin{pmatrix} I_{do} \\ I_{qo} \end{pmatrix} \quad (10)$$

The next equation is established, when the current command values of d-axis and q-axis Ido, Iqo are set to the switching current values of d-axis and q-axis IdPS, IqPS.

$$\begin{pmatrix} I_{do} \\ I_{qo} \end{pmatrix} = \begin{pmatrix} \frac{1}{s}I_{dPS} \\ \frac{1}{s}I_{qPS} \end{pmatrix} \quad (11)$$

The next equation is obtained, if the equation (11) is substituted for the equation (10) and rearranged.

$$\begin{pmatrix} I_d \\ I_q \end{pmatrix} = \begin{pmatrix} \frac{1}{s}I_{dPS} \\ \frac{1}{s}I_{qPS} \end{pmatrix} \quad (12)$$

The equation (12) means that if the current command values are set to the switching current values, the current values of d-axis and q-axis Id, Iq after starting the switching control become the constant values of the switching current values of d-axis and q-axis IdPS, IqPS corresponding to the all phase short circuit currents. Since the current values of d-axis and q-axis become the constant values, torque fluctuation does not occur.

On the other hand, in the conventional method, if the torque command value To is set to 0, the current command values of d-axis and q-axis Ido, Iqo are normally set to 0, as shown in the next equation.

$$\begin{pmatrix} I_{do} \\ I_{qo} \end{pmatrix} = \begin{pmatrix} 0 \\ 0 \end{pmatrix} \quad (13)$$

Even if the equation (13) is substituted for the equation (10), the current values of d-axis and q-axis Id, Iq do not become the constant values of the switching current values of d-axis and q-axis IdPS, IqPS corresponding to the all phase short circuit currents.

Control Behavior of Comparative Example

Figure 6:
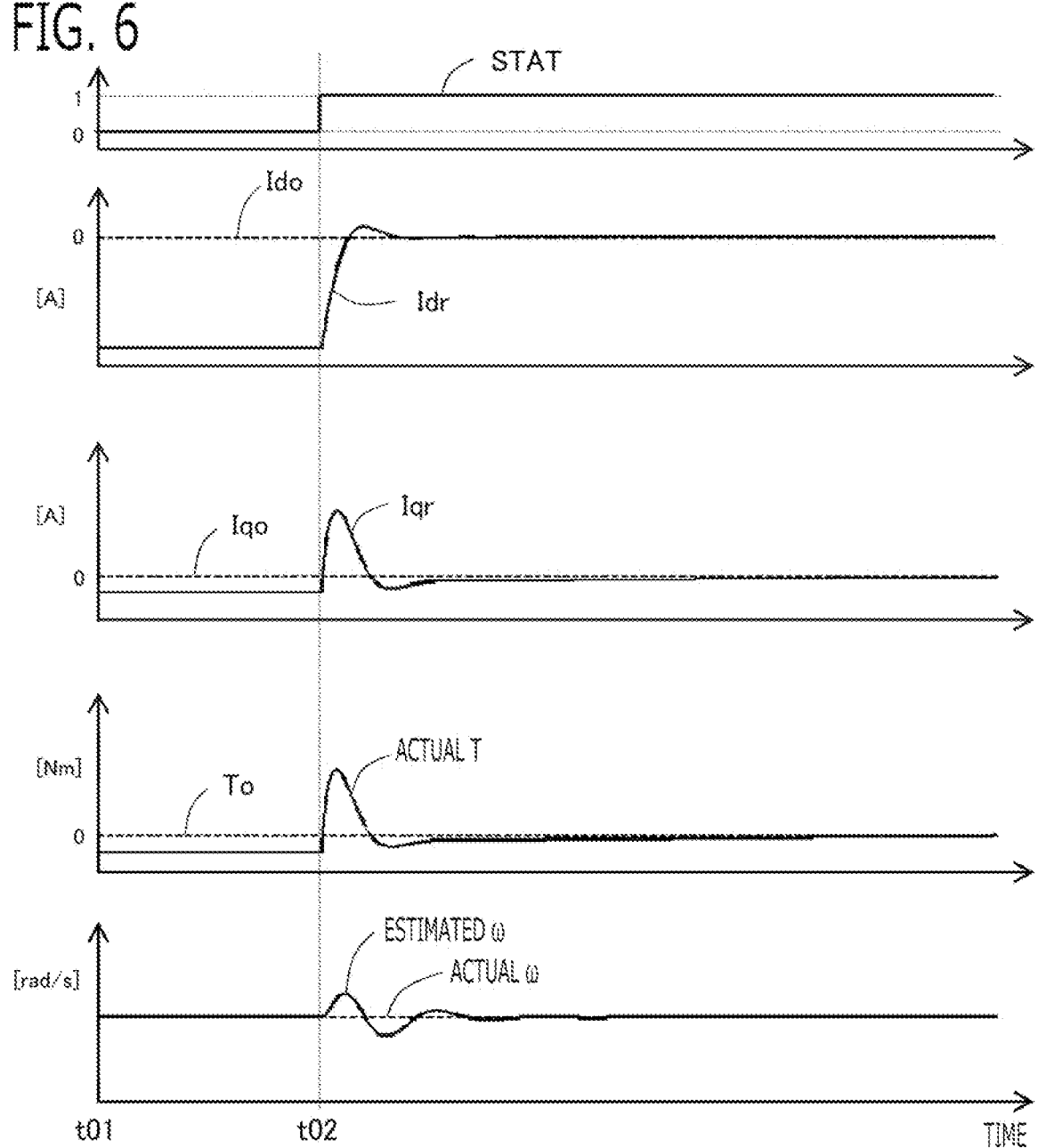
FIG. 6 is a time chart which shows the control behavior according to the comparative example.

FIG. 6 shows a control behavior of a comparative example. Before the time t01, the all phase short circuit control is executed. At the time t01, the current values of d-axis and q-axis Id, Iq are stabilized at near the switching current values of d-axis and q-axis IdPS, IqPS expressed by the equation (4). The first rotational angle θ1 and the first rotational angle speed ω1 estimated in all phase short circuit are also stabilized.

At the time t02, the execution command of the switching control is transmitted and the switching signal STAT is changed from 0 to 1. Accordingly, the execution of the all phase short circuit control is ended, and the execution of the switching control is started, and the estimation of the rotational angle and the rotational angle speed in switching control is started.

In the comparative example, after the start of the switching control (after the time t02), the current command value calculation unit 33 sets the current command values of d-axis and q-axis Ido, Iqo to the normal current command values of d-axis and q-axis IdoD, IqoD which are set based on the torque command value To. In the example of FIG. 6, IdoD=0 and IqoD=0.

Accordingly, at the time t02, since the deviations between the current values in the all phase short circuit state and the current command values become large, the operating amount by the current feedback control becomes excessive transitionally, and especially, the current detection value of q-axis Iqr deviates from the current command value of q-axis Iqo significantly and fluctuates. The torque T is fluctuated in proportion to variation of the current detection value of q-axis Iqr. By variation of the current detection values with respect to the current command values, variation of the estimation values of the rotational angle θ and the rotational angle speed ω become large.

Control Behavior of Present Embodiment

Figure 7:
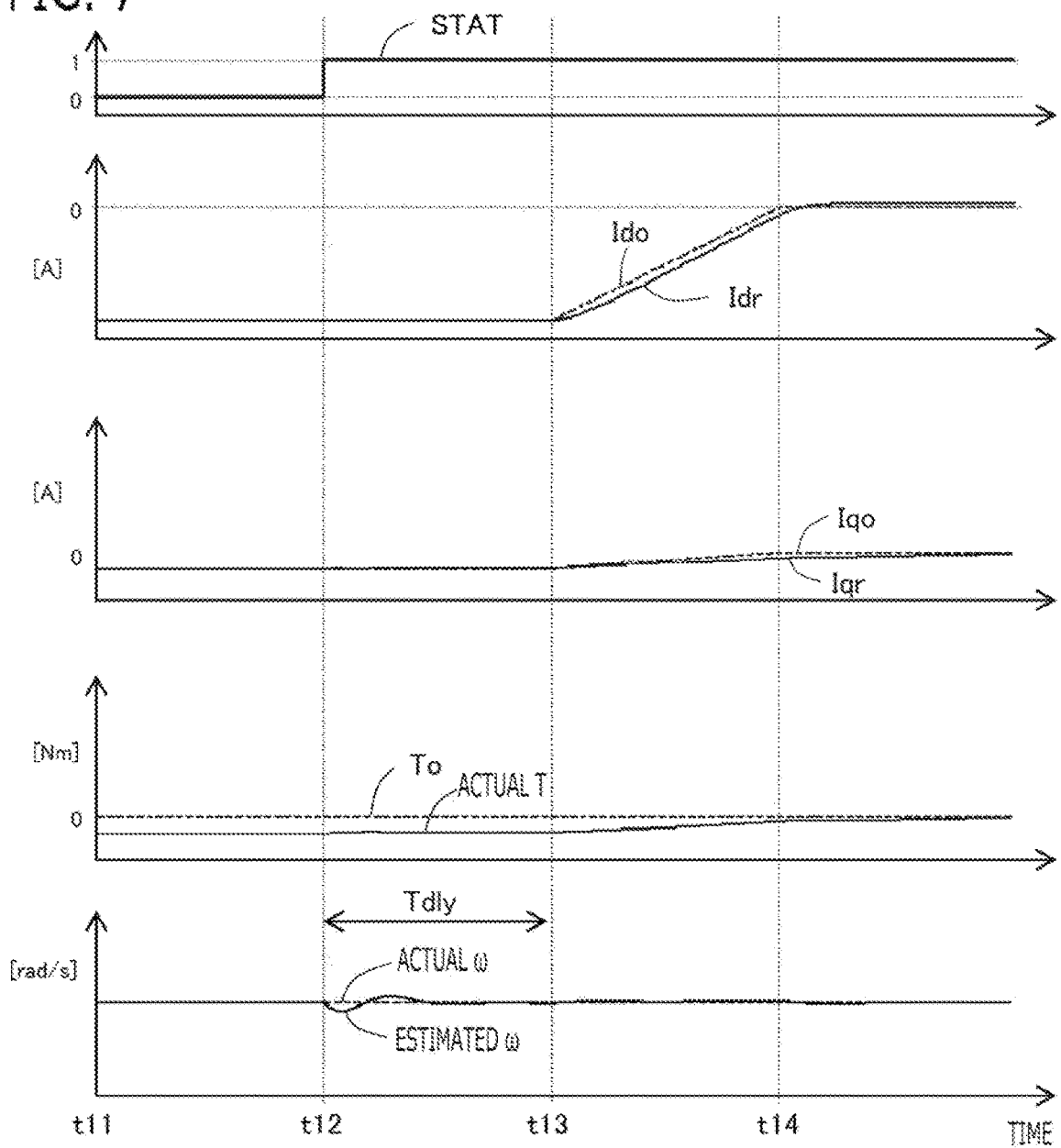
FIG. 7 is a time chart which shows the control behavior according to Embodiment 1.

FIG. 7 shows a control behavior according to the present embodiment. Before the time t11, the all phase short circuit control is executed. At the time t11, the current values of d-axis and q-axis Id, Iq are stabilized at near the switching current values of d-axis and q-axis IdPS, IqPS expressed by the equation (4). The first rotational angle θ1 and the first rotational angle speed ω1 estimated in all phase short circuit are also stabilized.

At the time t12, the execution command of the switching control is transmitted and the switching signal STAT is changed from 0 to 1. Accordingly, the execution of the all phase short circuit control is ended, and the execution of the switching control is started, and the estimation of the rotational angle and the rotational angle speed in switching control is started.

At switching from the all phase short circuit control to the switching control (the time t12), the current command value calculation unit 33 sets the current command values of d-axis and q-axis Ido, Iqo to the switching current values of d-axis and q-axis IdPS, IqPS. In the example of FIG. 7, considering that the first-order-lag filter processing is performed in the process for calculating the current command values of d-axis and q-axis Ido, Iqo, from during execution of the all phase short circuit control before the time t12, the current command value calculation unit 33 sets the current command values of d-axis and q-axis Ido, Iqo to the switching current values of d-axis and q-axis IdPS, IqPS, so that the current command values of d-axis and q-axis Ido, Iqo become the switching current values of d-axis and q-axis IdPS, IqPS when switching from the all phase short circuit control to the switching control (at the time point when the switching signal STAT changes from 0 to 1).

In the present embodiment, during a period until the waiting time Tdly elapses after starting the switching control (from the time t12 to the time t13), the current command value calculation unit 33 sets the current command values of d-axis and q-axis Ido, Iqo to the switching current values of d-axis and q-axis IdPS, IqPS.

At switching from the all phase short circuit control to the switching control (time t12), the initial values of the second rotational angle θ2 and the second rotational angle speed ω2 in switching control is set to the first rotational angle θ1 and the first rotational angle speed ω1 in all phase short circuit which were estimated just before.

Accordingly, after switching to the switching control, the deviations between the current detection values of d-axis and q-axis and the current command values of d-axis and q-axis become small, and the current detection values of d-axis and q-axis follow well, without fluctuating from the current command values of d-axis and q-axis. As a result, variation of torque is also suppressed.

In addition to setting of the initial values, since the tracking performance of the current detection values to the current command values is good, the estimation accuracy of the first rotational angle θ1 and the first rotational angle speed ω1 after switching to the switching control become good.

During the waiting time Tdly, variation of the current values, and variation of the estimation values of the rotational angle θ and the rotational angle speed ω are settled. At the time t13 when the waiting time Tdly elapsed, the current command value calculation unit 33 starts to change gradually the current command values of d-axis and q-axis Ido, Iqo from the switching current values of d-axis and q-axis IdPS, IqPS to the normal current command values of d-axis and q-axis IdoD, IqoD.

Since the current command values are changed gradually, the current detection values follow well with a predetermined control response, without deviating from the current command values significantly. Therefore, variation of torque, and variation of the estimation values of the rotational angle θ and the rotational angle speed ω are suppressed.

Then, at the time t14, the gradual change of the current command values is completed. After the time t14, the switching control is executed in the state where the current command values of d-axis and q-axis Ido, Iqo are set to the normal current command values of d-axis and q-axis IdoD, IqoD.

2. Embodiment 2

The controller 1 according to Embodiment 2 will be explained with reference to drawings. The explanation for constituent parts the same as those in Embodiment 1 will be omitted. The basic configuration of the AC rotary electric machine 2 and the controller 1 according to the present embodiment is the same as that of Embodiment 1. The setting method of the current command values at switching from the all phase short circuit control to the switching control is different from Embodiment 1.

As explained using the equation (6), assuming that the resistance value R of winding is sufficiently smaller than the impedance by the inductance of winding, if it is set that R=0 in the equation (4), the current value of d-axis Id and the current value of q-axis Iq in all phase short circuit are expressed by the next equation. The d-axis and q-axis currents of the next equation are current values in which the armature interlinkage flux interlinked to the three-phase windings becomes the minimum (for example, 0). In the present embodiment, these are set to the switching current value of d-axis IdPS and the switching current value of q-axis IqPS.

$$\begin{cases} I_d = -\dfrac{\psi_p}{L_d} = I_{dPS} \\ I_q = 0 = I_{qPS} \end{cases} \tag{14}$$

That is to say, in the present embodiment, when switching from the all phase short circuit control to the switching control, the current command value calculation unit 33 sets the current command values to the switching current values which are current values in which the magnitude of the armature interlinkage flux interlinked to the three-phase windings becomes the minimum. Specifically, the current command value calculation unit 33 sets the switching current value of d-axis IdPS and the switching current value of q-axis IqPS which are set by the equation (14), as the switching current values.

According to this configuration, since the current values in which the armature interlinkage flux becomes the minimum are close to the current values in the all phase short circuit state, it can be suppressed that at switching, the deviations between the current detection values and the current command values of the switching control become large. Accordingly, at switching, the current deviations between the current command values and the current detection values can be made small, it can be suppressed that the operating amount becomes excessive transitionally and the current values is fluctuated largely, and it can be suppressed that torque fluctuation occurs transitionally.

Even in the present embodiment, when switching from the all phase short circuit control to the switching control, the current command value calculation unit 33 sets the current command values of d-axis and q-axis Ido, Iqo to the switching current values of d-axis and q-axis IdPS, IqPS, and after that, changes gradually the current command values of d-axis and q-axis Ido, Iqo from the switching current values of d-axis and q-axis IdPS, IdPS to the normal current command values of d-axis and q-axis IdoD, IqoD which are normally set in the switching control.

And, when switching from the all phase short circuit control to the switching control, the current command value calculation unit 33 sets the current command values of d-axis and q-axis Ido, Iqo to the switching current values of d-axis and q-axis IdPS, IqPS, and after the waiting time Tdly elapses, changes gradually the current command values of d-axis and q-axis Ido, Iqo from the switching current values of d-axis and q-axis IdPS, IqPS to the normal current command values of d-axis and q-axis IdoD, IqoD which are normally set in the switching control.

<Setting of Switching Current Values by Target Value of Modulation Rate Mo=0>

Figure 8:
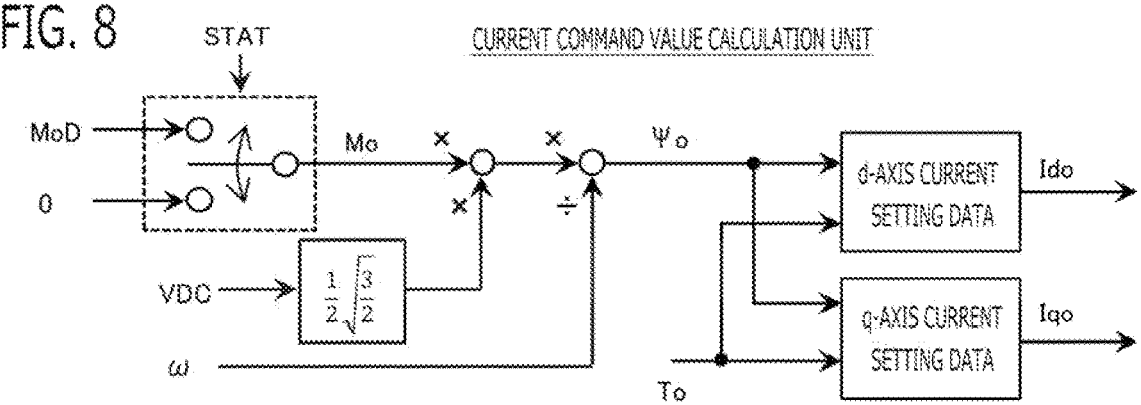
FIG. 8 is a block diagram of the current command value calculation unit according to Embodiment 2.

As shown in FIG. 8, similar to Embodiment 1, the current command value setting unit 33 sets the target value of modulation rate Mo.

In the present embodiment, by setting the target value of modulation rate Mo to 0 when switching from the all phase short circuit control to the switching control, the current command value calculation unit 33 sets the current command values to the switching current values which are current values in which the magnitude of the armature interlinkage flux becomes the minimum.

When switching from the all phase short circuit control to the switching control, the current command value calculation unit 33 sets the target value of modulation rate Mo to 0, and after that, changes gradually the target value of modulation rate Mo from 0 to the normal target value of modulation rate MoD which is normally set in the switching control.

When switching from the all phase short circuit control to the switching control, the current command value calculation unit 33 sets the target value of modulation rate Mo to 0, and after the waiting time Tdly elapses, changes gradually the target value of modulation rate Mo from 0 to the normal target value of modulation rate MoD.

The normal target value of modulation rate MoD is set to a constant value larger than 0 (for example, 1.2). The normal target value of modulation rate MoD may be changed based on operating condition, such as the torque command value To and the rotational angle speed ω.

Similar to Embodiment 1, the current command value calculation unit 33 calculates the interlinkage flux command value Ψo, based on the target value of modulation rate Mo. The current command value calculation unit 33 calculates the current command value of d-axis Ido and the current command value of q-axis Iqo, based on the interlinkage flux command value Ψo and the torque command value To. The calculation method of the current command values of d-axis and q-axis Ido, Iqo is the same as the calculation method of the normal current command values of d-axis and q-axis IdoD, IqoD of Embodiment 1.

By setting the target value of modulation rate Mo to 0, the interlinkage flux command value Ψo is set to 0, and the current command values corresponding to the switching current values in which the armature interlinkage flux becomes 0 is set. The interlinkage flux command value Ψo may be directly set to 0, without interposing the target value of modulation rate Mo. The current command values may be directly set to the switching current values, without interposing the target value of modulation rate Mo and the interlinkage flux command value Ψo.

<Flowchart>

Figure 9:
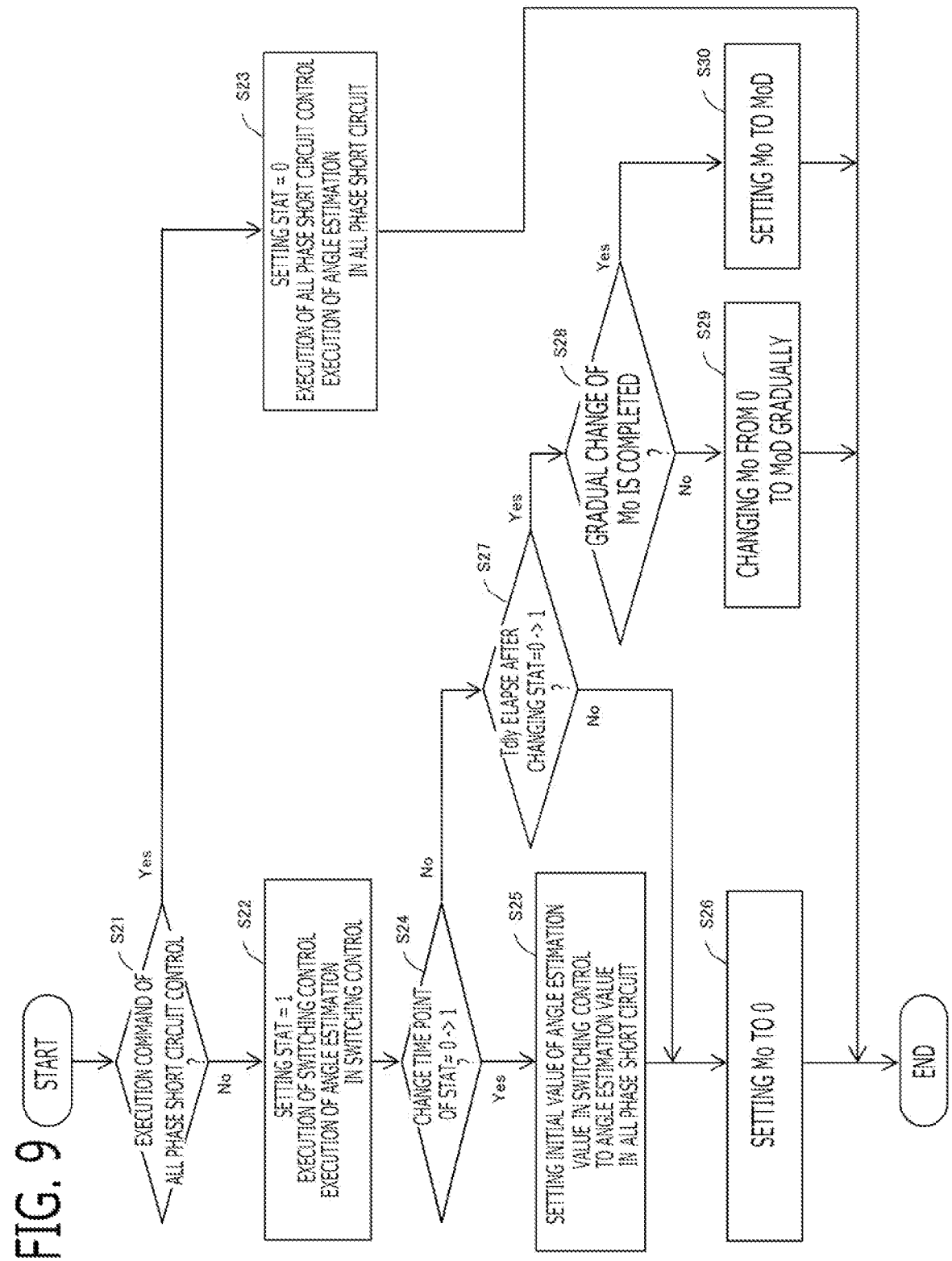
FIG. 9 is a flowchart for explaining the processing at switching according to Embodiment 2.

Processing of the controller related to switching between the all phase short circuit control and the switching control explained above will be explained using the flowchart of FIG. 9. Processing of FIG. 9 is executed at every predetermined calculation period, for example.

In the step S21, the changeover control unit 37 determines whether the execution command of the all phase short circuit control or the execution command of the switching control is transmitted. When the execution command of the switching control is transmitted, it advances to the step S22, and when the execution command of all phase short circuit control is transmitted, it advances to the step S23.

In the step S22, the changeover control unit 37 sets the switching signal STAT=1; and makes the current command value calculation unit 33, the voltage command value calculation unit 34, and the inverter control unit 35 execute the switching control, and makes the rotation detection unit 36 execute the estimation of the rotational angle and the rotational angle speed in switching control.

In the step S23, the changeover control unit 37 sets the switching signal STAT=0; and makes the inverter control unit 35 execute the all phase short circuit control, and makes the rotation detection unit 36 execute the estimation of the rotational angle and the rotational angle speed in all phase short circuit.

In the step S24, the current command value calculation unit 33 determines whether it is a time point when the switching signal STAT changes from 0 to 1; and when it is the change time point, it advances to the step S25, and when it is not the change time point, it advances to step S27. In the step S25, the rotation detection unit 36 sets the first rotational angle θ1 and the first rotational angle speed ω1 in all phase short circuit which were estimated just before the switching, as the initial values of the second rotational angle θ2 and the second rotational angle speed ω2 in switching control.

And, in the step S26, the current command value calculation unit 33 sets the target value of modulation rate Mo to 0. In the case where the first-order-lag filter processing is performed in the process for calculating the current command values of d-axis and q-axis Ido, Iqo from the target value of modulation rate Mo, the current command value calculation unit 33 may set the target value of modulation rate Mo to 0 during execution of the all phase short circuit control, so that the current command values of d-axis and q-axis Ido, Iqo become current values corresponding to Mo=0 (in this example, the switching current values of d-axis and q-axis IdPS, IqPS) when switching from the all phase short circuit control to the switching control (at the time point when the switching signal STAT changes from 0 to 1). Alternatively, the current command value calculation unit 33 may reset the internal arithmetic values, such as the last time calculation values of the first-order-lag filter processing, to current values corresponding to Mo=0, so that the current command values of d-axis and q-axis Ido, Iqo become current values corresponding to Mo=0 (in this example, the switching current values of d-axis and q-axis IdPS, IqPS) when switching from the all phase short circuit control to the switching control (at the time point when the switching signal STAT changes from 0 to 1).

In the step S27, the current command value calculation unit 33 determines whether the waiting time Tdly elapses after the switching signal STAT changes from 0 to 1; and when not elapsing, it advances to the step S26, and when elapsing, it advances to the step S28. In the step S26, the current command value setting unit 33 sets the target value of modulation rate Mo to 0.

On the other hand, in the step S28, the current command value calculation unit 33 determines whether the gradual change of the target value of modulation rate Mo from 0 to the normal target value of modulation rate MoD which is executed after the waiting time Tdly elapses is completed; and when not completing, it advances to the step S29, and when completing, it advances to the step S30.

In the step S29, the current command value calculation unit 33 changes gradually the target value of modulation rate Mo from 0 to the normal target value of modulation rate MoD.

On the other hand, in the step S30, the current command value calculation unit 33 sets the target value of modulation rate Mo to the normal target value of modulation rate MoD.

<Control Behavior>

Figure 10:
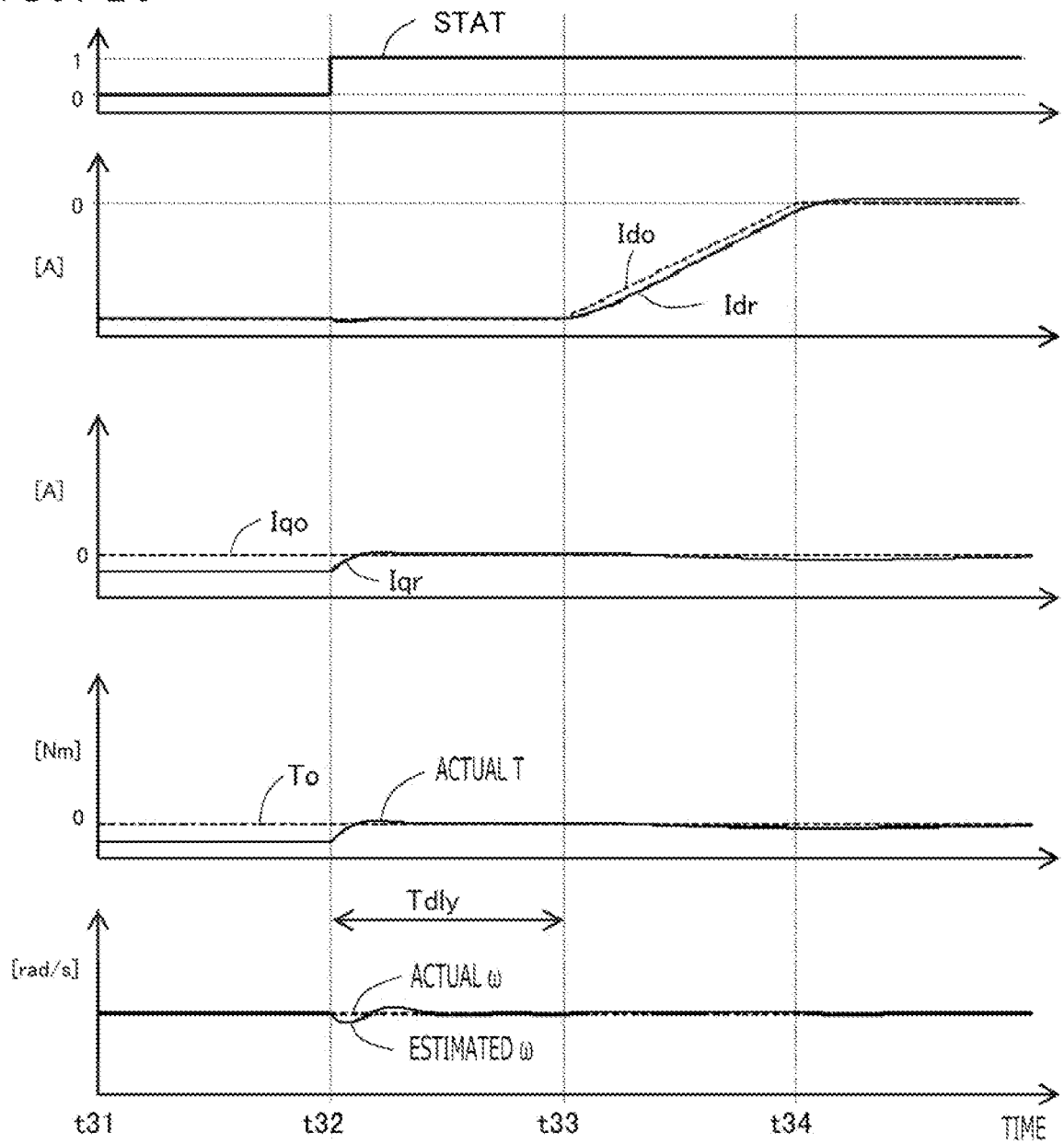
FIG. 10 is a time chart which shows the control behavior according to Embodiment 2.

FIG. 10 shows a control behavior according to the present embodiment. Before the time t31, the all phase short circuit control is executed. At the time t31, the current values of d-axis and q-axis Id, Iq are stabilized at near the current values of d-axis and q-axis in the all phase short circuit state expressed by the equation (4). The first rotational angle θ1 and the first rotational angle speed ω1 estimated in all phase short circuit are also stabilized.

At the time t32, the execution command of the switching control is transmitted and the switching signal STAT is changed from 0 to 1. Accordingly, the execution of the all phase short circuit control is ended, and the execution of the switching control is started, and the estimation of the rotational angle and the rotational angle speed in switching control is started.

At switching from the all phase short circuit control to the switching control (the time t32), the current command value calculation unit 33 sets the target value of modulation rate Mo to 0, and sets the current command values of d-axis and q-axis Ido, Iqo to the switching current values of d-axis and q-axis IdPS, IPS in which the armature interlinkage flux becomes 0 and which are expressed by the equation (14). In the example of FIG. 10, considering that the first-order-lag filter processing is performed in the process for calculating the current command values of d-axis and q-axis Ido, Iqo from the target value of modulation rate Mo, from during execution of the all phase short circuit control before the time t32, the current command value calculation unit 33 sets the target value of modulation rate Mo to 0, so that the current command values of d-axis and q-axis Ido, Iqo become the switching current values of d-axis and q-axis IdPS, IqPS corresponding to Mo=0 when switching from the all phase short circuit control to the switching control (at the time point when the switching signal STAT changes from 0 to 1).

In the present embodiment, during a period until the waiting time Tdly elapses after starting the switching control (from the time t32 to the time t33), the current command value calculation unit 33 sets the target value of modulation rate Mo to 0, and sets the current command values of d-axis and q-axis Ido, Iqo to the switching current values of d-axis and q-axis IdPS, IqPS.

At switching from the all phase short circuit control to the switching control (time t32), the initial values of the second rotational angle θ2 and the second rotational angle speed ω2 in switching control is set to the first rotational angle θ1 and the first rotational angle speed ω1 in all phase short circuit which were estimated just before.

The current command values of d-axis and q-axis Ido, Iqo (especially, the current command value of d-axis Ido) is set near the current values of d-axis and q-axis in the all phase short circuit state. Accordingly, after switching to the switching control, the deviations between the current detection values of d-axis and q-axis and the current command values of d-axis and q-axis become small, and the current detection values of d-axis and q-axis follow well, without fluctuating from the current command values of d-axis and q-axis. As a result, variation of torque is also suppressed.

After switching to the switching control, torque becomes 0, and approaches the torque command value To rather than Embodiment 1.

In addition to setting of the initial values, since the tracking performance of the current detection values to the current command values is good, the estimation accuracy of the first rotational angle θ1 and the first rotational angle speed ω1 after switching to the switching control become good.

During the waiting time Tdly, variation of the current values, and variation of the estimation values of the rotational angle θ and the rotational angle speed ω are settled. At the time t33 when the waiting time Tdly elapsed, the current command value calculation unit 33 starts to change gradually the target value of modulation rate Mo from 0 to the normal target value of modulation rate MoD. As a result, the current command values of d-axis and q-axis Ido, Iqo changes gradually from current values corresponding to Mo=0 to current values corresponding to Mo=Mod.

Since the current command values are changed gradually, the current detection values follow well with a predetermined control response, without deviating from the current command values significantly. Therefore, variation of torque, and variation of the estimation values of the rotational angle θ and the rotational angle speed ω are suppressed.

Then, at the time t34, the gradual change of the target value of modulation rate Mo is completed. After the time t34, the switching control is executed in the state where the target value of modulation rate Mo is set to the normal target value of modulation rate MoD.

<Additional Effect by Setting Current Command Values which Make Armature Interlinkage Flux Minimum>

Figure 11:
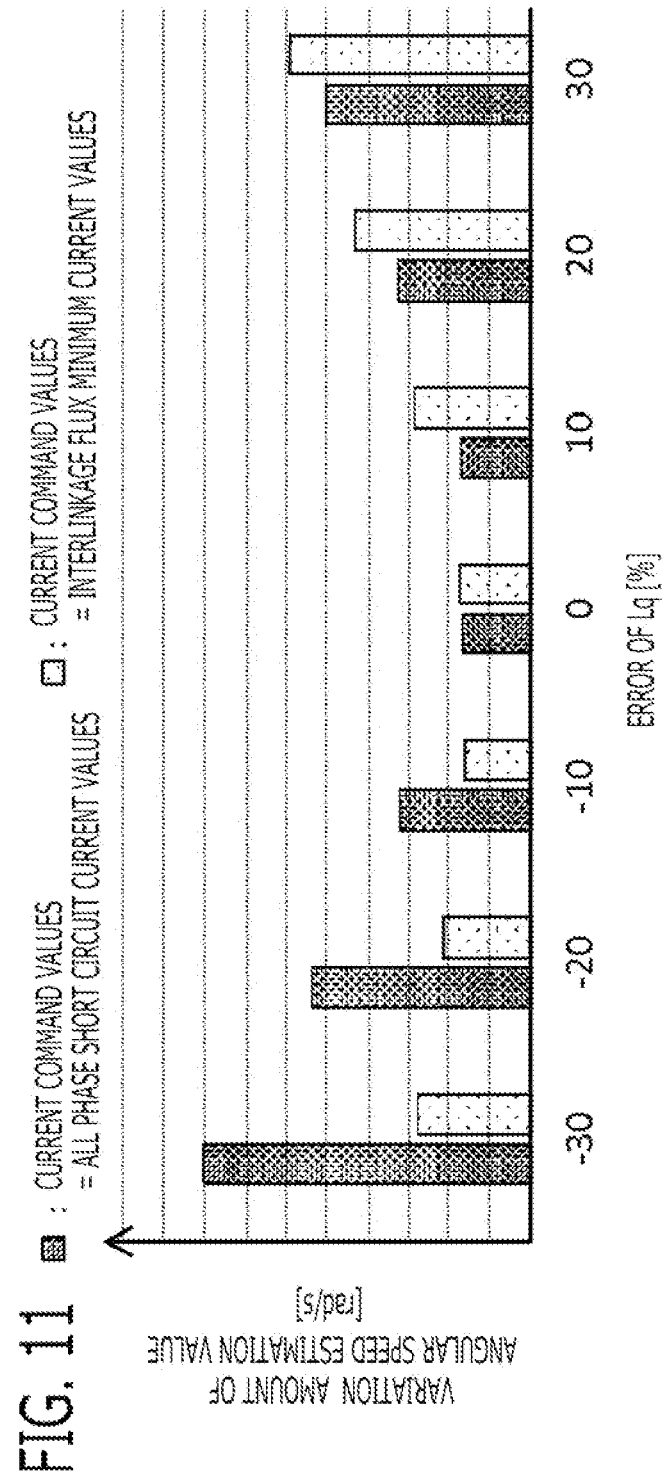
FIG. 11 is a figure for explaining the effect of Embodiment 2.

Then, an additional effect by setting the current command values which make the armature interlinkage flux the minimum will be explained. FIG. 11 shows an example of variation amount of the estimation value of the rotational angle speed ω after switching from the all phase short circuit control to the switching control (hereinafter, referred to the variation amount of the angular speed estimation value after switching), in the case where the q-axis inductance Lq used in the controller 1 has an error. In each error when changing the error of the q-axis inductance Lq, FIG. 11 shows the variation amount of the angular speed estimation value after switching in the case of setting the current command values to the current values in all phase short circuit state like Embodiment 1 (hereinafter, referred to the case of all phase short circuit current values), and the variation amount of the angular speed estimation value after switching in the case of setting the current command values to the current values which make the armature interlinkage flux the minimum like the present embodiment (hereinafter, referred to the case of interlinkage flux minimum current values).

As seen from this figure, when there is no error of the q-axis inductance Lq, or when there is a plus error, the variation amount of the angular speed estimation value after switching in the case of the all phase short circuit current values is smaller than the variation amount of the angular speed estimation value after switching in the case of the interlinkage flux minimum current values. On the other hand, when there is a minus error of the q-axis inductance Lq, the variation amount of the angular speed estimation value after switching in the case of the interlinkage flux minimum current values is smaller than the variation amount of the angular speed estimation value after switching in the case of the all phase short circuit current values.

This is because by setting the current command values to the interlinkage flux minimum current values, the current command values deviates from the all phase short circuit current values, and the variation of the angular speed estimation value becomes comparatively large. On the other hand, by setting the current command values to the interlinkage flux minimum current values, the estimation error of the q-axis current of the adaptive observer which occurs due to the minus error of the q-axis inductance Lq becomes comparatively small, and the variation of the angular speed estimation value also becomes comparatively small.

Comparing the plus error with the minus error, by setting the current command values to the interlinkage flux minimum current values, a possibility that the variation of the angular speed estimation value becomes small becomes higher. Even in the case where the q-axis inductance Lq is not obtained accurately, Embodiment 2 has an advantage of being easily applied.

3. Embodiment 3

The controller 1 according to Embodiment 3 will be explained with reference to drawings. The explanation for constituent parts the same as those in Embodiment 1 will be omitted. The basic configuration of the AC rotary electric machine 2 and the controller 1 according to the present embodiment is the same as that of Embodiment 1. The setting method of the switching current values is different from Embodiment 1.

In the present embodiment, the current command value calculation unit 33 sets the switching current values, based on the current detection values during execution of the all phase short circuit control.

According to this configuration, even when the characteristic of the AC rotary electric machine 2 is fluctuated due to variation factors, such as an aging change, a production variation, and a temperature characteristic, the switching current values can be set with good accuracy, based on the current detection values during execution of the all phase short circuit control.

Figure 12:
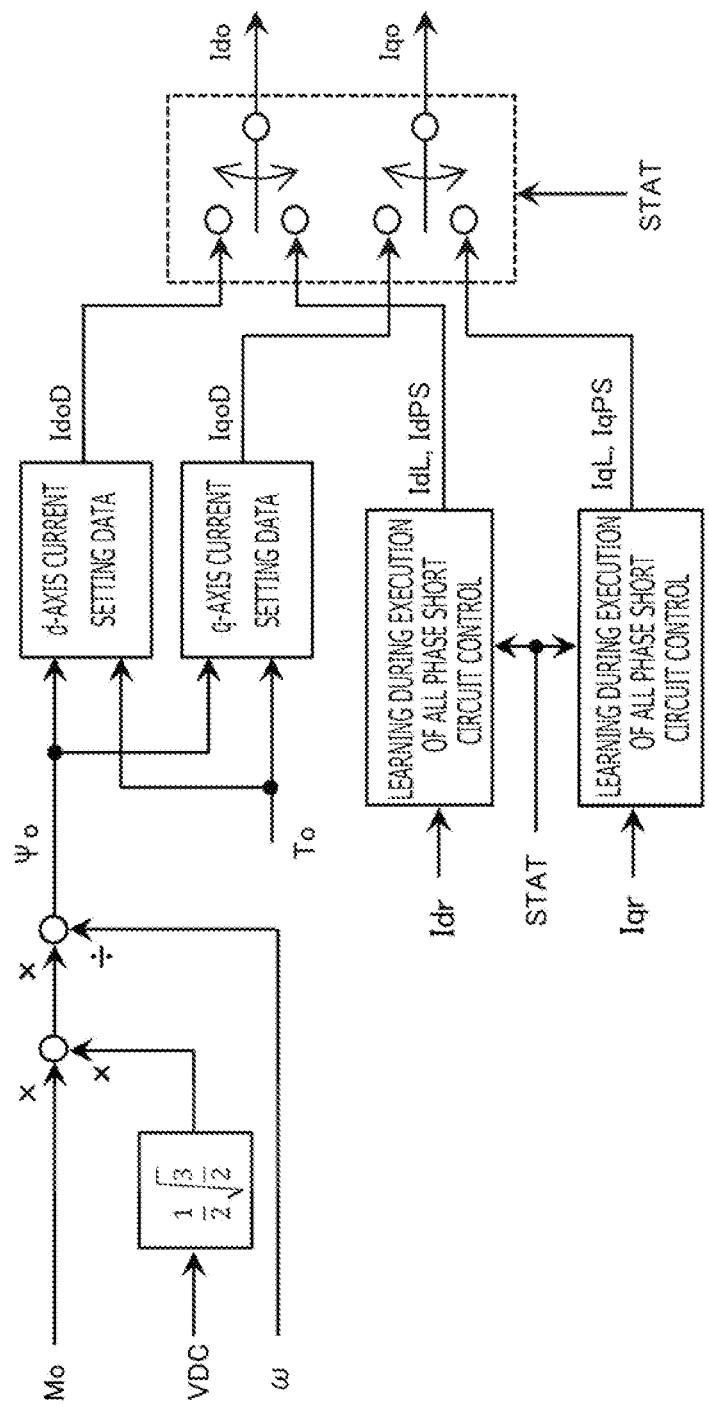
FIG. 12 is a block diagram of the current command value calculation unit according to Embodiment 3.

In the present embodiment, as shown in FIG. 12, the current command value calculation unit 33 learns the current detection value of d-axis Idr and the current detection value of q-axis Iqr during execution of the all phase short circuit control. For example, the current command value calculation unit 33 performs a statistical processing to the current detection value of d-axis Idr and the current detection value of q-axis Iqr during execution of the all phase short circuit control, and calculates a current learning value of d-axis IdL and a current learning value of q-axis IqL during execution of the all phase short circuit control. The current learning value of d-axis IdL and the current learning value of q-axis IqL correspond to the switching current values of d-axis and q-axis IdPS, IqPS. As the statistical processing, an averaging processing, allow pass filter processing, a least square method, or the like is used. The learning values are stored in the storage apparatus, such as RAM. Then, when switching from the all phase short circuit control to the switching control (at the time point when the switching signal STAT changes from 0 to 1), the current command value calculation unit 33 sets the current command values of d-axis and q-axis Ido, Iqo, to the current learning value of d-axis IdL and the current learning value of q-axis IqL as the switching current values.

Although illustration of flowchart according to the present embodiment is omitted. In the step S06 of FIG. 5 of Embodiment 1, the current command value calculation unit 33 sets the current command values of d-axis and q-axis Ido, Iqo to the current learning value of d-axis IdL and the current learning value of q-axis IqL as the switching current values of d-axis and q-axis IdPS, IqPS. And, in the step S03 of FIG. 5, the current command value calculation unit 33 performs a statistical processing to the current detection value of d-axis Idr and the current detection value of q-axis Iqr during execution of the all phase short circuit control, and calculates the current learning value of d-axis IdL and the current learning value of q-axis IqL during execution of the all phase short circuit control.

Example of Conversion (2) In each of the above-mentioned Embodiments, the application of the AC rotary electric machine was not specified. For example, the AC rotary electric machine may be used for a driving force source of vehicle wheels. In the present disclosure, since the torque fluctuation at switching from the all phase short circuit control to the switching control can be suppressed, the shock which a driver feels can be reduced and a comfortability of the driver can be improved. The AC rotary electric machine may be used for a driving force source of various kinds of apparatus other than the vehicle wheels.

(2) In each of the above-mentioned Embodiments, the permanent magnet type AC rotary electric machine was explained as an example. However, as long as the AC rotary electric machine generates an induced voltage at rotating, various kinds of the AC rotary electric machine, such as a field winding type, may be used.

(3) In each of the above-mentioned Embodiments, there was explained the case where the three-phase windings is provided. However, as long as the phase number of windings is plural-phase, it may be set to any number, such as two-phase or four-phase.

(4) In each of the above-mentioned Embodiments, there was explained the case where one set of the three-phase windings and the inverter is provided. However, two or more sets of the plural-phase windings and the inverter may be provided, and the control similar to each Embodiment may be performed to each set of the plural-phase windings and the inverter.

(5) In each of the above-mentioned Embodiments, there was explained the case where the current command value calculation unit 33 uses the interlinkage flux command value Ψo as the middle parameter, changes the interlinkage flux command value Ψo based on the target value of modulation rate Mo and the like, and sets the current command values based on the interlinkage flux command value Vo. However, the current command value calculation unit 33 may set the current command values, without using the interlinkage flux command value Vo. For example, as disclosed in JP 2012-200073 A, the current command value calculation unit 33 may use the voltage shortage ratio as the middle parameter, change the voltage shortage ratio based on the target value of modulation rate Mo and the like, and may set the current command values based on the voltage shortage ratio.

The current command value calculation unit 33 may set the normal current command values using various kinds of well-known current vector control. For example, the current command value calculation unit 33 may set the normal current command values of d-axis and q-axis IdoD, IqoD by the maximum torque/current control or the magnetic flux weakening control, based on the torque command value To, the rotational angle speed ω, the power source voltage VDC, and the like. And, when switching from the all phase short circuit control to the switching control, the current command value calculation unit 33 may set the current command values of d-axis and q-axis Ido, Iqo to the switching current values of d-axis and q-axis IdPS, IqPS which were explained in each of above Embodiments.

(6) In each of the above-mentioned Embodiments, there was explained the case where without using an angle sensor which detects the rotational angle, the rotational angle θ and the rotational angle speed ω are estimated based on the current detection values and the like. However, an angle sensor, such as a Hall element, an encoder, or a resolver, may be provided, and the rotational angle θ and the rotational angle speed ω may be estimated based on the output signal of the angle sensor. In this case, the waiting time Tdly may be set to 0.

Although the present disclosure is described above in terms of an exemplary embodiment, it should be understood that the various features, aspects and functionality described in the embodiment are not limited in their applicability to the particular embodiment with which they are described, but instead can be applied, alone or in various combinations to the embodiment. It is therefore understood that numerous modifications which have not been exemplified can be devised without departing from the scope of the present disclosure. For example, at least one of the constituent components may be modified, added, or eliminated.

What is claimed is:

1. A controller for AC rotary electric machine that controls an AC rotary electric machine which is provided with a stator having plural-phase windings and a rotor via an inverter, the controller for AC rotary electric machine comprising at least one processor configured to implement:
    a current detector that detects currents which flows into the plural-phase windings;
    a current command value calculator that sets current command values;
    a voltage command value calculator that calculates voltage command values, based on the current command values and current detection values; and
    an inverter controller that carries out switching between a switching control that turns on and off plural switching devices provided in the inverter based on the voltage command values, and applies voltages to the plural-phase windings, and all phase short circuit control that turns on and off the plural switching devices so that the plural-phase windings are short-circuited mutually,
    wherein when switching from the all phase short circuit control to the switching control, the current command value calculator sets the current command values to switching current values which are current values corresponding to currents which flow in executing the all phase short circuit control,
    wherein the current command value calculator sets a current command value of d-axis and a current command value of q-axis as the current command values,
    wherein the voltage command value calculator calculates the voltage command values, based on the current command value of d-axis, the current command value of q-axis, a current detection value of d-axis, and a current detection value of q-axis, and
    wherein when setting the rotational angle speed in an electrical angle of the rotor to ω, setting an inductance of d-axis to Ld, setting an inductance of q-axis to Lq, setting an interlinkage flux of a magnet of the rotor to Ψp, setting a resistance value of the winding to R, setting a switching current value of d-axis to IdPS, and setting a switching current value of q-axis to IqPS,
    the current command value calculator calculates, as the switching current values, the switching current value of d-axis and the switching current value of q-axis, using a calculation equation of $$I_{dPS} = -\frac{\omega^2 \psi_p L_q}{R^2 + \omega^2 L_d L_q}$$
$$I_{qPS} = -\frac{\omega \psi_p R}{R^2 + \omega^2 L_d L_q}.$$

2. The controller for AC rotary electric machine according to claim 1, wherein the current command value calculator sets the switching current values, based on a rotational angle speed of the rotor.

3. The controller for AC rotary electric machine according to claim 1, wherein the current command value calculator sets the switching current values, based on the current detection values during execution of the all phase short circuit control.

4. The controller for AC rotary electric machine according to claim 1,
    wherein when switching from the all phase short circuit control to the switching control, the current command value calculator sets the current command values to the switching current values, and after that, gradually changes the current command values from the switching current values to normal current command values which are normally set in the switching control.

5. The controller for AC rotary electric machine according to claim 1,
    wherein when switching from the all phase short circuit control to the switching control, the current command value calculator sets the current command values to the switching current values, and after the waiting time elapses, gradually changes the current command values from the switching current values to the normal current command values which are normally set in the switching control.

6. The controller for AC rotary electric machine according to claim 5,
    wherein the waiting time is set corresponding to a period until currents are stabilized to the switching current values after starting the switching control.

7. The controller for AC rotary electric machine according to claim 1,
    wherein the AC rotary electric machine is a driving force source of wheel of vehicle.

8. A controller for AC rotary electric machine that controls an AC rotary electric machine which is provided with a stator having plural-phase windings and a rotor via an inverter, the controller for AC rotary electric machine comprising at least one processor configured to implement:
    a current detector that detects currents which flows into the plural-phase windings;

a current command value calculator that sets current command values;

a voltage command value calculator that calculates voltage command values, based on the current command values and current detection values; and an inverter controller that carries out switching between a switching control that turns on and off plural switching devices provided in the inverter based on the voltage command values, and applies voltages to the plural-phase windings, and all phase short circuit control that turns on and off the plural switching devices so that the plural-phase windings are short-circuited mutually, wherein when switching from the all phase short circuit control to the switching control, the current command value calculator sets the current command values to switching current values which are current values in which a magnitude of an armature interlinkage flux interlinked to the plural-phase windings becomes the minimum, wherein the current command value calculator sets a current command value of d-axis and a current command value of q-axis as the current command values, wherein the voltage command value calculator calculates the voltage command values, based on the current command value of d-axis, the current command value of q-axis, a current detection value of d-axis, and a current detection value of q-axis, and wherein when setting an inductance of d-axis to Ld, setting an interlinkage flux of a magnet of the rotor to Ψp, setting a switching current value of d-axis to IdPS, and setting a switching current value of q-axis to IqPS, the current command value calculator sets, as the switching current values, the switching current value of d-axis and the switching current value of q-axis which are set by an equation of $$I_{dPS} = -\frac{\psi_p}{L_d}.$$
$$I_{qPS} = 0$$

9. The controller for AC rotary electric machine according to claim 8, wherein the current command value calculator calculates the current command values, based on an interlinkage flux command value and a torque command value, and when switching from the all phase short circuit control to the switching control, by setting the interlinkage flux command value to 0, the current command value calculator sets the current command values to the switching current values which are current values in which the magnitude of the armature interlinkage flux becomes the minimum.

10. The controller for AC rotary electric machine according to claim 8, wherein the current command value calculator calculates an interlinkage flux command value, based on a modulation rate target value, and calculates the current command values, based on the interlinkage flux command value and a torque command value; and when switching from the all phase short circuit control to the switching control, by setting the modulation rate target value to 0, the current command value calculator sets the interlinkage flux command value to 0, and sets the current command values to the switching current values which are current values in which the magnitude of the armature interlinkage flux becomes the minimum.

11. The controller for AC rotary electric machine according to claim 8, wherein when switching from the all phase short circuit control to the switching control, the current command value calculator sets the current command values to the switching current values, and after that, gradually changes the current command values from the switching current values to normal current command values which are normally set in the switching control.

12. The controller for AC rotary electric machine according to claim 8, wherein when switching from the all phase short circuit control to the switching control, the current command value calculator sets the current command values to the switching current values, and after a waiting time elapses, gradually changes the current command values from the switching current values to normal current command values which are normally set in the switching control.

13. The controller for AC rotary electric machine according to claim 12, wherein the waiting time is set corresponding to a period until currents are stabilized to the switching current values after starting the switching control.

14. The controller for AC rotary electric machine according to claim 8, wherein the AC rotary electric machine is a driving force source of wheel of vehicle.

* * * * *